United States Patent
Fujimoto et al.

(10) Patent No.: US 7,297,825 B2
(45) Date of Patent: Nov. 20, 2007

(54) CATALYST AND PROCESS FOR LPG PRODUCTION

(75) Inventors: Kaoru Fujimoto, Fukuoka (JP); Kenji Asami, Fukuoka (JP); Sachio Asaoka, Fukuoka (JP); Xiaohong Li, Fukuoka (JP); Qianwen Zhang, Fukuoka (JP)

(73) Assignee: Japan Gas Synthesize, Ltd., Tokyo (JP)

( * ) Notice: Subject to any disclaimer, the term of this patent is extended or adjusted under 35 U.S.C. 154(b) by 231 days.

(21) Appl. No.: 10/929,841

(22) Filed: Aug. 30, 2004

(65) Prior Publication Data

US 2006/0009349 A1    Jan. 12, 2006

(30) Foreign Application Priority Data

Jul. 7, 2004    (JP) ............... 2004-200333

(51) Int. Cl.
*C07C 1/04*    (2006.01)
*C07C 1/12*    (2006.01)

(52) U.S. Cl. .............. 585/310; 585/700; 585/733; 518/700; 518/702; 518/711; 518/715

(58) Field of Classification Search ............ 585/310, 585/700, 733; 518/700, 702, 711, 715
See application file for complete search history.

(56) References Cited

U.S. PATENT DOCUMENTS 4,252,736 A * 2/1981 Haag et al. ............. 518/702

6,566,568 B1 * 5/2003 Chen ....................... 585/310

FOREIGN PATENT DOCUMENTS

JP    61-23688    2/1986

OTHER PUBLICATIONS

Kaoru Fujimoto, et al., Selective Synthesis of LPG from Synthesis Gas, The Chemical Society of Japan, Oct. 1985, vol. 58 No. 10, pp. 3059-3060.

Qianwen Zhang, et al., Synthesis of LPG from Synthesis Gas with Hybrid Catalyst, Faculty of Environmental Engineering, The University of Kitakyushu, pp. 179-180, no date available.

Naoto Koizumi, et al. Methanol Synthesis Activity of Alkaline Earth and Lanthanoid Metal Added Sulfided PD/SIO$_2$ and Their Surface Fine Structures Investigated by Drift Spectroscopy, Fuel Chemistry Division Preprints 2002, 47(1), pp. 140-141, 2002 no month.

* cited by examiner

*Primary Examiner*—Elizabeth D. Wood
(74) *Attorney, Agent, or Firm*—Knobbe Martens Olson & Bear LLP

(57) ABSTRACT

A catalyst for producing a liquefied petroleum gas according to the present invention comprises a Pd-based methanol synthesis catalyst component and a β-zeolite catalyst component. It can be used in a reaction of carbon monoxide and hydrogen to give a hydrocarbon containing propane or butane as a main component, i.e., a liquefied petroleum gas, with high activity, high selectivity and high yield. Furthermore, the catalyst has a longer catalyst life with less deterioration.

13 Claims, 3 Drawing Sheets

- CO conversion in Example 1
- (C3 + C4) content in Example 1
- CO conversion in Comparative Example 1
- (C3 + C4) content in Comparative Example

- CO conversion
- Conversion of CO to a hydrocarbon
- (C3 + C4) content

CATALYST AND PROCESS FOR LPG PRODUCTION

TECHNICAL FIELD

This invention relates to a catalyst for producing a liquefied petroleum gas containing propane or butane as a main component by reacting carbon monoxide with hydrogen.

This invention also relates to a process for producing a liquefied petroleum gas containing propane or butane as a main component from a synthesis gas using the catalyst. This invention also relates to a process for producing a liquefied petroleum gas containing propane or butane as a main component from a carbon-containing starting material such as a natural gas using the catalyst.

BACKGROUND OF THE INVENTION

Liquefied petroleum gas (LPG) is a liquefied petroleum-based or natural gas-based hydrocarbon which is gaseous at ambient temperature under atmospheric pressure by compression while optionally cooling, the main component being propane or butane. LPG is advantageously stored or transported in liquid form. Thus, in contrast with a natural gas that requires a pipeline for supply, it can be filled in a container to be supplied to any place. For this reason, LPG comprising propane as a main component, i.e., propane gas has been widely used as a fuel for household and business use. At present, propane gas is supplied to about 25 million households (more than 50% of the total households) in Japan. In addition to household and business use, LPG is used as a fuel for a portable product such as a portable gas burner and a disposable lighter (mainly, butane gas), an industrial fuel and an automobile fuel.

Conventionally, LPG has been produced by 1) collection from a wet natural gas, 2) collection from a stabilization (vapor-pressure regulating) process of crude petroleum, 3) separation and extraction of a product in, for example, a petroleum refining process, or the like.

LPG, in particular propane gas used as a household/business fuel, can be expected to be in great demand in the future. Thus, it may be very useful to establish an industrially practicable and new process for producing LPG.

As a process for producing LPG, Japanese Patent Laid-open Publication No. 61-23688 discloses that a synthesis gas consisting of hydrogen and carbon monoxide is reacted in the presence of a mixed catalyst obtained by physically mixing a methanol synthesis catalyst such as a Cu—Zn-based catalyst, a Cr—Zn-based catalyst and a Pd-based catalyst, specifically a CuO—ZnO—$Al_2O_3$ catalyst or a Pd/$SiO_2$ catalyst with a methanol conversion catalyst composed of a zeolite having an average pore size of about 10 Å (1 nm) or more, specifically a Y-type zeolite, to give a liquefied petroleum gas or a mixture of hydrocarbons similar in composition to LPG.

In terms of the zeolite catalyst, the above-mentioned Japanese Patent Laid-open Publication No. 61-23688 describes that the distribution of hydrocarbons produced significantly depends on the pore size of the zeolite, and that when a zeolite having a larger pore size (Y-type zeolite) is used, lower paraffins of $C_1$ to $C_6$, particularly $C_2$ to $C_4$, are produced with a high selectivity while controlling production of aromatic hydrocarbons. In terms of the zeolite catalyst, the above-mentioned Japanese Patent Laid-open Publication No. 61-23688 also describes that although it has a restriction for a pore size, any type of zeolite catalyst meeting the condition can be applied, irrespective of variation in a molecular structure or micropore structure or a variety of preparation treatments. Meanwhile, in terms of a methanol synthesis catalyst, the above-mentioned Japanese Patent Laid-open Publication No. 61-23688 describes that a variety of simple substances and composites of a metal or a metal-oxide can be used if they have the ability to hydrogenate.

Furthermore, the above-mentioned Japanese Patent Laid-open Publication No. 61-23688 also describes that acidity of a zeolite can be increased by dealumination, and thereby the yield of hydrocarbons (lower paraffins) can be improved, from the comparison between the reaction results using a mixed catalyst comprising a dealuminated Y-type zeolite with $SiO_2/Al_2O_3=7.6$ as a methanol conversion catalyst and the reaction results using a mixed catalyst comprising a non-dealuminated Y-type zeolite with $SiO_2/Al_2O_3=5.1$.

The catalyst described in the above-mentioned Japanese Patent Laid-open Publication No. 61-23688, however, does not necessarily show sufficient performance.

For example, a catalyst consisting of Pd/$SiO_2$ and a Y-type zeolite is less active and gives a lower yield of a hydrocarbon, in which a ratio of propane (C3) and butane (C4) is lower. A catalyst consisting of Pd/$SiO_2$ and a dealuminated Y-type zeolite with $SiO_2/Al_2O_3=7.6$ treated with steam at 450° C. for 2 hours has a higher activity and gives a higher yield of a hydrocarbon, in which a ratio of propane (C3) and butane (C4) is higher, but it may not have sufficient performance particularly in terms of activity and yield of a hydrocarbon. Moreover, in general, a catalyst consisting of Pd/$SiO_2$ and a Y-type zeolite may be significantly deteriorated with time, and thus, it may not have a sufficiently long catalyst life.

On the other hand, as a general trend, a catalyst consisting of a Cu—Zn-based catalyst (a copper-zinc-alumina mixed oxide and a commercially available catalyst for methanol synthesis at a low pressure) and a Y-type zeolite has a higher activity and gives a higher yield of a hydrocarbon, in which a ratio of propane (C3) and butane (C4) is higher, in comparison with a catalyst consisting of Pd/$SiO_2$ and a Y-type zeolite. Among them, a catalyst consisting of a Cu—Zn-based catalyst and a dealuminated Y-type zeolite with $SiO_2/Al_2O_3=7.6$ treated with steam at 450° C. for 2 hours has a high activity and gives a high yield of a hydrocarbon, in which a ratio of propane (C3) and butane (C4) is high. However, a catalyst consisting of a Cu—Zn-based catalyst and a Y-type zeolite may be significantly deteriorated with time, and thus, it may not have a sufficiently long catalyst life in general. It is, therefore, difficult to stably produce LPG in a high yield for a long period using the catalyst.

Thus, it has been needed further improvement of a catalyst for producing a liquefied petroleum gas in order to practically use a process for producing LPG from a synthesis gas and a process for producing LPG from a carbon-containing starting material such as a natural gas.

As a process for producing LPG, "Selective Synthesis of LPG from Synthesis Gas", Kaoru Fujimoto et al., Bull. Chem. Soc. Jpn., 58, p. 3059-3060 (1985) discloses that a hybrid catalyst consisting of a methanol synthesis catalyst such as a 4 wt % Pd/$SiO_2$, a Cu—Zn—Al mixed oxide {Cu:Zn:Al=40:23:37 (atomic ratio)} or a Cu-based low-pressure methanol synthesis catalyst (Trade name: BASF S3-85) and a high-silica Y-type zeolite with $SiO_2/Al_2O_3=7.6$ treated with steam at 450° C. for 1 hour can be used to produce C2 to C4 paraffins in a selectivity of 69 to 85% via methanol and dimethyl ether from a synthesis gas. However, as is for the catalyst described in the above-mentioned Japanese Patent Laid-open Publication No. 61-23688, the catalyst described in the reference may not show sufficient performance.

In addition, "Synthesis of LPG from Synthesis Gas with Hybrid Catalyst", Qianwen Zhang et al., Dai 33 Kai Sekiyu Sekiyu Kagaku Toronkai Koen Yoshi (the summaries of the 33th Petroleum and Petrochemistry Discussion), p. 179-180, Nov. 17, 2003 discloses that a hybrid catalyst consisting of Pd—$SiO_2$ or Pd, Ca—$SiO_2$ and a zeolite can be used to produce LPG from a synthesis gas.

SUMMARY OF THE INVENTION

An objective of this invention is to provide a less deteriorative catalyst for producing a liquefied petroleum gas with a longer catalyst life, which can produce a hydrocarbon containing propane or butane as a main component, i.e., a liquefied petroleum gas (LPG), by reacting carbon monoxide and hydrogen, with high activity, high selectivity and high yield.

Another objective of this invention is to provide a process for stably producing LPG with a high concentration of propane and/or butane from a synthesis gas in a high yield for a long period, using the catalyst. A further objective of this invention is to provide a process for stably producing LPG with a high concentration of propane and/or butane from a carbon-containing starting material such as a natural gas in a high yield for a long period.

The present invention provides a catalyst for producing a liquefied petroleum gas, which is used for producing a liquefied petroleum gas containing propane or butane as a main component by reacting carbon monoxide and hydrogen, comprising a Pd-based methanol synthesis catalyst component and a β-zeolite catalyst component.

Moreover, the present invention provides a process for producing a liquefied petroleum gas, comprising the step of:

reacting carbon monoxide and hydrogen in the presence of the catalyst for producing a liquefied petroleum gas as described above to produce a liquefied petroleum gas containing propane or butane as a main component.

Moreover, the present invention provides a process for producing a liquefied petroleum gas, comprising the step of:

feeding a synthesis gas to a catalyst layer comprising the catalyst for producing a liquefied petroleum gas as described above to produce a liquefied petroleum gas containing propane or butane as a main component (Liquefied petroleum gas production process).

Moreover, the present invention provides a process for producing a liquefied petroleum gas, comprising the steps of:

(1) producing a synthesis gas from a carbon-containing starting material and at least one selected from the group consisting of $H_2O$, $O_2$ and $CO_2$ (Synthesis gas production process); and (2) feeding the synthesis gas to a catalyst layer comprising the catalyst for producing a liquefied petroleum gas as described above to produce a liquefied petroleum gas containing propane or butane as a main component (Liquefied petroleum gas production process).

Herein, "synthesis gas" means a mixed gas comprising hydrogen and carbon monoxide, and is not limited to a mixed gas consisting of hydrogen and carbon monoxide. A synthesis gas may be, for example, a mixed gas comprising carbon dioxide, water, methane, ethane, ethylene and so on. A synthesis gas produced by reforming a natural gas generally contains, in addition to hydrogen and carbon monoxide, carbon dioxide and water vapor. A synthesis gas may be a coal gas produced by coal gasification or a water gas produced from a coal coke.

A catalyst for producing a liquefied petroleum gas according to this invention comprises a Pd-based methanol synthesis catalyst as a methanol synthesis catalyst component and β-zeolite as a zeolite catalyst component. The catalyst for producing a liquefied petroleum gas according to this invention can produce a hydrocarbon containing propane or butane as a main component, i.e., a liquefied petroleum gas (LPG) with high activity, high selectivity and a high yield, by reacting carbon monoxide and hydrogen, and has a longer catalyst life with less deterioration.

By reacting carbon monoxide and hydrogen in the presence of the catalyst according to this invention, the reaction represented by the following formula (1) may proceed to give LPG containing propane or butane as a main component.

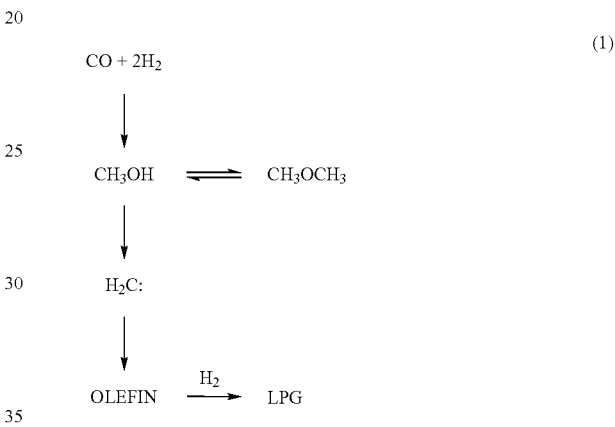

First, on the methanol synthesis catalyst component, methanol is formed from carbon monoxide and hydrogen, while dimethyl ether is also formed by dehydro-dimerization of methanol. Then, methanol thus formed is converted to a lower-olefin hydrocarbon comprising propylene or butene as a main component at an active site in a pore in the zeolite catalyst component. In the reaction, methanol would be dehydrated to give a carbene ($H_2C$:), which is subjected to polymerization to give a lower olefin. The lower olefin thus generated is released from the pore in the zeolite catalyst component and is rapidly hydrogenated on the methanol synthesis catalyst to give a paraffin comprising propane or butane as a main component, i.e., LPG.

Herein, a "methanol synthesis catalyst component" means a compound which can act as a catalyst in the reaction of $CO + 2H_2 \rightarrow CH_3OH$. And a "zeolite catalyst component" means a zeolite which can act as a catalyst in a condensation reaction of methanol into a hydrocarbon and/or a condensation reaction of dimethyl ether into a hydrocarbon.

As a methanol synthesis catalyst, a Cu—Zn-based catalyst (a composite oxide containing Cu and Zn) and a Zn—Cr-based catalyst (a composite oxide containing Zn and Cr) are widely used. However, sufficient catalyst performance cannot be always achieved when using, in place of a Pd-based methanol synthesis catalyst, a Cu—Zn-based methanol synthesis catalyst or a Zn—Cr-based methanol synthesis catalyst as a methanol synthesis catalyst component in a catalyst for producing a liquefied petroleum gas in production of LPG by reacting carbon monoxide and hydrogen. Furthermore, sufficient catalyst performance cannot be always achieved when using a zeolite other than β-zeolite (for example, a Y-type zeolite) as a zeolite catalyst component in case a Pd-based methanol synthesis catalyst is used as a methanol synthesis catalyst component in a catalyst for producing a liquefied petroleum gas.

The reaction of carbon monoxide and hydrogen for producing LPG depends on a variety of factors. Therefore, the reason why the catalyst for producing a liquefied petroleum gas of this invention exhibits excellent performance is not clear, but the followings might be assumed.

A reaction of carbon monoxide and hydrogen for forming methanol ($CO+2H_2 \rightarrow CH_3OH$) is an equilibrium reaction. And, the equation: $CO+2H_2=CH_3OH+100$ kJ indicates that the equilibrium of methanol formation is more advantageous as a temperature is lower. However, when reacting carbon monoxide and hydrogen to produce LPG, methanol formed on a methanol synthesis catalyst component is rapidly converted to a lower-olefin hydrocarbon at an active site in a pore in the zeolite catalyst component. There are, therefore, substantially no restrictions to the equilibrium of methanol formation. Thus, it is not necessarily required to conduct the reaction at a lower temperature for achieving a sufficiently high yield. On the other hand, it is advantageous to conduct the reaction at a higher temperature in terms of a reaction rate. In the light of activity of the zeolite catalyst component, it is desirable that the methanol synthesis catalyst component has great heat-resistance to some degree. Specifically, the methanol synthesis catalyst can be used preferably at 270° C. or higher, more preferably 300° C. or higher, further preferably 320° C. or higher.

Among methanol synthesis catalysts, a Cu—Zn-based catalyst is generally used at a relatively lower temperature (about 230 to 300° C.) and its heat resistance is not so higher than other methanol synthesis catalysts. When producing LPG by reacting carbon monoxide and hydrogen at an elevated temperature for achieving higher activity and higher yield, it is not necessarily preferable to use a conventional Cu—Zn-based catalyst as a methanol synthesis catalyst component.

On the other hand, among methanol synthesis catalysts, a Zn—Cr-based catalyst is generally used at a relatively higher temperature (about 250 to 400° C.). There does not appear to be a particular problem in using a Zn—Cr-based catalyst as a methanol synthesis catalyst component when making a reaction temperature higher.

However, when producing LPG by reacting carbon monoxide and hydrogen, a methanol synthesis catalyst component is required to act as a catalyst in a hydrogenation reaction of an olefin into a paraffin. A conventional Zn—Cr-based catalyst does not, however, have sufficient hydrogenating ability. Thus, when producing LPG by reacting carbon monoxide and hydrogen, it is not necessarily preferable to use a conventional Zn—Cr-based catalyst as a methanol synthesis catalyst component.

A Pd-based methanol synthesis catalyst, which is used as a methanol synthesis catalyst component in this invention, is known to act as a catalyst in the methanol synthesis reaction ($CO+2H_2 \rightarrow CH_3OH$), but it is not widely used as a methanol synthesis catalyst. However, in the light of its high thermal stability and hydrogenating ability, it is suitable as a methanol synthesis catalyst component in a catalyst used in producing a liquefied petroleum gas by reacting carbon monoxide and hydrogen, particularly at an elevated reaction temperature.

As a methanol synthesis catalyst component, it is particularly preferable to use a catalyst in which 0.1 to 10 wt % Pd is supported on a silica support having a specific surface area of 420 $m^2$/g or more.

Examples of a zeolite catalyst component used in combination with a Pd-based methanol synthesis catalyst include various zeolites such as Y-type, ZSM-5, mordenite, SAPO-34 and MCM-22 zeolites, but all of the zeolites cannot give a catalyst with excellent performance. Although the reason is not clear, a catalyst for producing a liquefied petroleum gas exhibiting prominently excellent performance can be obtained in case that a methanol synthesis catalyst component is a Pd-based methanol synthesis catalyst and a zeolite catalyst component is β-zeolite. A Y-type zeolite is preferably a zeolite catalyst component in combination with a Cu—Zn-based catalyst, but is less preferable than β-zeolite as a zeolite catalyst component used in combination with a Pd-based methanol synthesis catalyst.

As a zeolite catalyst component, a middle-pore zeolite (a zeolite with a pore size of 0.44 to 0.65 nm formed mainly by a 10-membered ring) or large-pore zeolite (a zeolite with a pore size of 0.66 to 0.76 nm formed mainly by a 12-membered ring) where pores into which reactant molecules can diffuse three-dimensionally extend; in other words, where reactant molecules three-dimensionally diffuse in pores, for example, ZSM-5, MCM-22, β- and Y-type zeolites may be preferable. As a zeolite catalyst component, a so-called high-silica zeolite may be preferable; specifically, a zeolite with a $SiO_2/Al_2O_3$ molar ratio of 10 to 150. When a high silica zeolite having active sites in a lower density in which diffusion of reactant molecules is limited is used as a zeolite catalyst component, a polymerization reaction completes with a lower polymerization degree, giving a lower olefin comprising propylene or butene as a main component. The lower olefin thus produced can be easily released from a pore in the zeolite catalyst component, which is relatively larger and three-dimensionally extends, allowing a reactant molecule to diffuse. Then, the olefin is rapidly hydrogenated on the methanol synthesis catalyst component to become inactivated in further polymerization and thus to be stabilized. Use of the above component as a zeolite catalyst component makes it possible to produce propylene and/or butene and to produce propane and/or butane with a higher selectivity.

However, an important factor for a zeolite catalyst component may not be limited to a pore size and a $SiO_2/Al_2O_3$ molar ratio. Other factors such as an acid strength, a pore structure and a crystal size may be also important for a zeolite catalyst component. Performance of a catalyst for producing a liquefied petroleum gas, particularly its activity and LPG selectivity, strongly depends on the balance among three parameters, the ability of a methanol synthesis catalyst component to form methanol, the ability of a methanol synthesis catalyst component to hydrogenate an olefin into a paraffin, and the ability of a zeolite catalyst component to form a hydrocarbon from methanol, and they are thought to be influenced by a variety of factors.

As a zeolite catalyst component, it is particularly preferable to use a proton type β-zeolite with a $SiO_2/Al_2O_3$ molar ratio of 10 to 150.

Furthermore, a catalyst for producing a liquefied petroleum gas according to the present invention has a longer catalyst life and is less deteriorated with time. The catalyst for producing a liquefied petroleum gas according to this invention can produce propane and/or butane, i.e., LPG with high activity and high yield for a longer period, in comparison with, for example, a catalyst comprising a Cu—Zn-based methanol synthesis catalyst and Y-type zeolite or a catalyst comprising a Pd-based methanol synthesis catalyst and a Y-type zeolite. A catalyst for producing a liquefied petroleum gas comprising a Cu—Zn-based methanol synthesis catalyst as a methanol synthesis catalyst component is relatively unstable in a reaction atmosphere having higher concentrations of $CO_2$ and $H_2O$ at high-temperature. On the other hand, a Y-type zeolite is thermally less stable than β-zeolite. Improving stability and extending life of a catalyst are very important for practical application of a process for producing LPG from a synthesis gas and a process for producing LPG from a carbon-containing starting material such as a natural gas.

A nickel catalyst, for example, is widely used as a catalyst in a hydrogenation reaction of an olefin into a paraffin. But if a substance cannot act as a catalyst in a methanol synthesis reaction ($CO+2H_2 \rightarrow CH_3OH$), it is, of course, unpreferable as a methanol synthesis catalyst component used in this invention.

The reaction conditions are also important for stably producing LPG for a long period with a high conversion, a high selectivity and a high yield by reacting carbon monoxide and hydrogen in the presence of a catalyst for producing a liquefied petroleum gas of this invention. This invention may be particularly effective when carbon monoxide and hydrogen are reacted at a reaction temperature of 300° C. to 420° C. (both inclusive) and under a reaction pressure of 2.2 MPa to 10 MPa (both inclusive).

According to this invention, for example, even after 50 hours from the reaction beginning, the catalyst can exhibit such a high activity that a conversion of CO is 50% or more, specifically 60% or more, more specifically 70% or more, further specifically 80% or more, to give a hydrocarbon with the total content of propane and butane of 60% or more, specifically 70% or more.

Furthermore, according to this invention, LPG with the total content of propane and butane of 90 mol % or more, specifically 95 mol % or more (including 100 mol %), for example, can be produced. And, according to this invention, LPG with a content of propane of 50 mol % or more, specifically 60 mol % or more (including 100 mol %), for example, can be produced.

DESCRIPTION OF THE MAIN SYMBOLS

Figure 1:
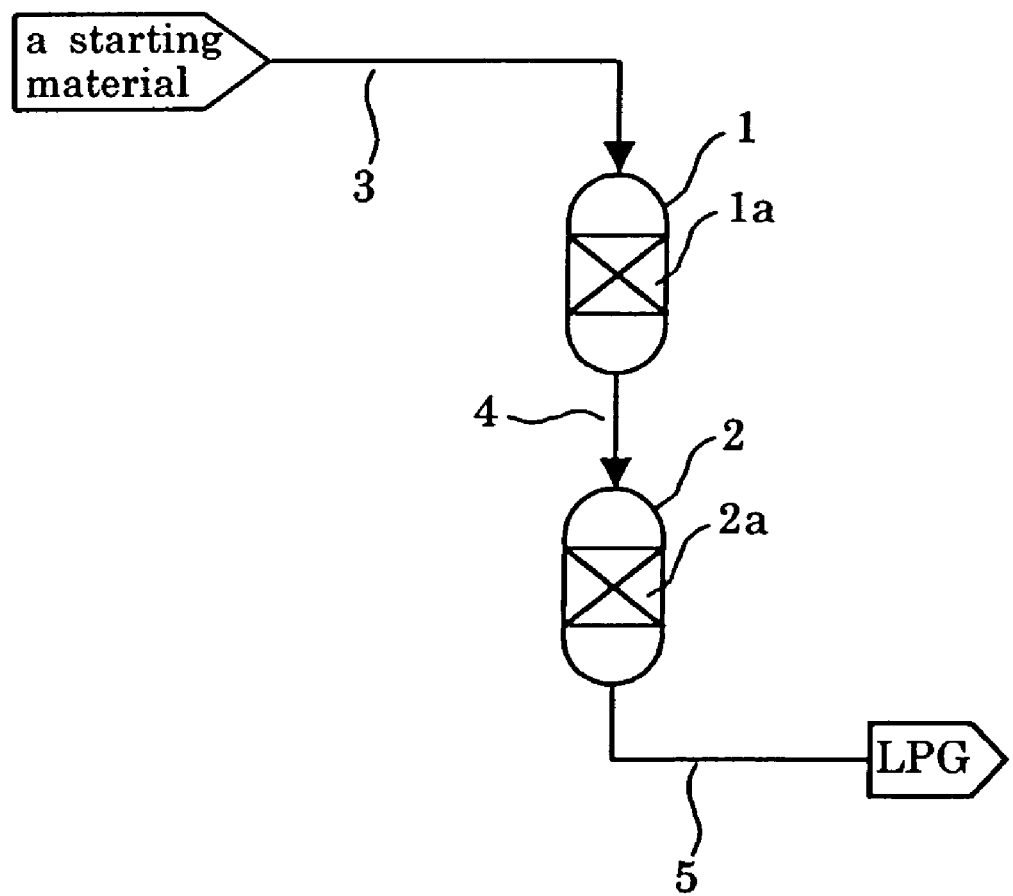
FIG. 1 is a process flow diagram showing a main configuration in an example of an LPG producing apparatus suitable for conducting the process for LPG production according to this invention.

1: a reformer
1a: a reforming catalyst layer
2: a reactor
2a: a catalyst layer
3, 4, 5: lines.

DETAILED DESCRIPTION OF THE EMBODIMENTS

1. Catalyst for Producing a Liquefied Petroleum Gas According to the Present Invention A catalyst for producing a liquefied petroleum gas according to the present invention comprises a Pd-based methanol synthesis catalyst component as a methanol synthesis catalyst component and a β-zeolite catalyst component as a zeolite catalyst component.

Herein, a "Pd-based methanol synthesis catalyst component" means a compound which comprises Pd and can act as a catalyst in the reaction of $CO+2H_2 \rightarrow CH_3OH$. And a "β-zeolite catalyst component" means a β-zeolite which can act as a catalyst in a condensation reaction of methanol into a hydrocarbon and/or a condensation reaction of dimethyl ether into a hydrocarbon.

A catalyst for producing a liquefied petroleum gas of this invention can comprise other additive components as long as its intended effect would not be impaired.

A ratio of the Pd-based methanol synthesis catalyst component to the β-zeolite catalyst component (Pd-based methanol synthesis catalyst component/β-zeolite catalyst component; by weight) is preferably 0.1 or more, more preferably 0.5 or more. A ratio of the Pd-based methanol synthesis catalyst component to the β-zeolite catalyst component (Pd-based methanol synthesis catalyst component/β-zeolite catalyst component; by weight) is preferably 3 or less, more preferably 2.5 or less. By adjusting a ratio of the Pd-based methanol synthesis catalyst component to the β-zeolite catalyst component within the above range, propane and/or butane can be produced with a higher selectivity and a higher yield.

A Pd-based methanol synthesis catalyst component acts as a methanol synthesis catalyst and a hydrogenation catalyst for an olefin. A β-zeolite catalyst component acts as a solid acid zeolite catalyst, whose acidity is adjusted, in a condensation reaction of methanol into a hydrocarbon and/or a condensation reaction of dimethyl ether into a hydrocarbon. A ratio of the Pd-based methanol synthesis catalyst component to the β-zeolite catalyst component is, therefore, reflected in a relative ratio of the ability to form methanol and the ability to hydrogenate an olefin to the ability to form a hydrocarbon from methanol, which the catalyst of this invention has. In this invention, when reacting carbon monoxide and hydrogen to produce a liquefied petroleum gas comprising propane or butane as a main component, carbon monoxide and hydrogen must be sufficiently converted into methanol by the action of a Pd-based methanol synthesis catalyst component, and methanol produced must be sufficiently converted, by the action of a β-zeolite catalyst component, into an olefin comprising propylene or butene as a main component, which must be converted into a liquefied petroleum gas comprising propane or butane as a main component by the action of a Pd-based methanol synthesis catalyst component.

By adjusting a ratio of the Pd-based methanol synthesis catalyst component to the β-zeolite catalyst component (Pd-based methanol synthesis catalyst component/β-zeolite catalyst component; by weight) to 0.1 or more, more preferably 0.5 or more, carbon monoxide and hydrogen can be converted into methanol with a higher conversion. Furthermore, by adjusting a ratio of the Pd-based methanol synthesis catalyst component to the β-zeolite catalyst component (Pd-based methanol synthesis catalyst component/β-zeolite catalyst component; by weight) to 0.8 or more, methanol produced can be converted into a liquefied petroleum gas comprising propane or butane as a main component with a higher selectivity.

On the other hand, by adjusting a ratio of the Pd-based methanol synthesis catalyst component to the β-zeolite catalyst component (Pd-based methanol synthesis catalyst component/β-zeolite catalyst component; by weight) to 3 or less, more preferably 2.5 or less, methanol can be converted into a liquefied petroleum gas comprising propane or butane as a main component with a higher conversion.

A ratio of the Pd-based methanol synthesis catalyst component to the β-zeolite catalyst component is not limited to the above range, and can be appropriately determined, depending on the amount of Pd in the Pd-based methanol synthesis catalyst component, and the like.

(Pd-Based Methanol Synthesis Catalyst Component)

A Pd-based methanol synthesis catalyst component may be selected, without limitation, from those which comprise Pd and can act as a catalyst in the reaction: $CO+2H_2 \rightarrow CH_3OH$, and a known Pd-based methanol synthesis catalyst can be used.

Pd may not be necessarily contained as a metal, but can be contained in the form of an oxide, a nitrate, a chloride or the like. In such a case, for achieving higher catalytic activity, the catalyst can be subjected to, for example, reduction by hydrogen before the reaction, to convert Pd in the Pd-based methanol synthesis catalyst component into metallic palladium.

Examples of a Pd-based methanol synthesis catalyst component include Pd, preferably metallic Pd, supported on a support. In the light of catalytic activity, Pd is preferably supported on a support in a highly dispersed manner.

The amount of supported Pd in a Pd-based methanol synthesis catalyst component is preferably 0.1 wt % or more, more preferably 0.5 wt % or more, particularly preferably 1 wt % or more. In the light of dispersibility and economical efficiency, the amount of supported Pd in a Pd-based methanol synthesis catalyst component is preferably 10 wt % or less, more preferably 8 wt % or less, particularly preferably 6 wt % or less. By adjusting the amount of supported Pd in a Pd-based methanol synthesis catalyst component within the above range, propane and/or butane can be produced with a higher conversion, a higher selectivity and a higher yield.

By adjusting the amount of supported Pd to be 0.1 wt % or more, more preferably 0.5 wt % or more, particularly preferably 1 wt % or more, carbon monoxide and hydrogen can be converted into methanol with a higher conversion, and methanol produced can be converted into a liquefied petroleum gas comprising propane or butane as a main component with a higher selectivity. On the other hand, by adjusting the amount of supported Pd to be 10 wt % or less, more preferably 8 wt % or less, particularly preferably 6 wt % or less, methanol produced can be converted into a liquefied petroleum gas comprising propane or butane as a main component with a higher conversion.

A support for Pd may be selected from known supports without limitation. Examples of a support include silica (silicon dioxide), alumina, silica-alumina, carbon (activated charcoal); and oxides of zirconium, titanium, cerium, lanthanum, iron or the like, and composite oxides containing two or more types of these metals, and composite oxides containing one or more types of these metals and one or more types of other metals. Such supports may be used alone or in combination of two or more.

A support is preferably neutral to basic. By using a neutral to basic support, higher activity and selectivity can be achieved in methanol synthesis.

Among others, a preferable support for Pd is silica. By using silica as a support, methanol can be produced with a higher selectivity and a higher yield without producing a hydrocarbon and carbon dioxide as a by-product.

A silica support preferably has a specific surface area of 420 $m^2/g$ or more, more preferably 450 $m^2/g$ or more, particularly preferably 475 $m^2/g$ or more, further preferably 500 $m^2/g$ or more. By using a silica support having a specific surface area within the above range, higher catalytic activity can be achieved and propane and/or butane can be produced with a higher conversion and a higher yield.

The upper limit of a specific surface area of a silica support is not particularly restricted, but is generally about 300 $m^2/g$.

A specific surface area of silica can be determined, for example, by a BET method using $N_2$ as an adsorption gas and a fully automatic measuring apparatus for specific surface area and pore distribution (e.g., ASAP2010, Shimadzu Corporation).

A silica support preferably has an average pore size of 5.5 nm or less, more preferably 5 nm or less, particularly preferably 4.5 nm or less, further preferably 4 nm or less. By using a silica support having an average pore size within the above range, higher catalytic activity can be achieved and propane and/or butane can be produced with a higher conversion and a higher yield.

The lower limit of an average pore size of a silica support is not particularly restricted, but is generally about 1 nm.

When silica is used as a support, it can support one or more types of basic metals, in addition to Pd. By supporting a basic metal in addition to Pd on a silica support, catalytic activity may be further improved and propane and/or butane may be produced with a higher conversion and a higher yield.

Herein, a "basic metal" means a metal whose oxide is a basic oxide.

Examples of a basic metal include alkali metals, alkaline earth metals, lanthanoid metals and low-valence transition metals; specifically, Ca, Sr, La, Nd, Mg, Li, Na and the like. Basic metals may be used alone or in combination of two or more.

Among others, a preferable basic metal is Ca. By using Ca as a basic metal, dispersibility of Pd can be improved, and thus higher catalytic activity can be achieved and propane and/or butane can be produced with a higher conversion and a higher yield.

The total amount of basic metals supported on a Pd-based methanol synthesis catalyst component is preferably 0.01 wt % or more, more preferably 0.5 wt % or more. The amount of supported basic metals within the above range can result in sufficient effect of supporting a basic metal on silica as described above.

On the other hand, the total amount of basic metals supported on a Pd-based methanol synthesis catalyst component is preferably 5 wt % or less, more preferably 3 wt % or less. By adjusting the amount of supported basic metals within the above range, dispersibility of Pd can be improved, and thus higher catalytic activity can be achieved and propane and/or butane can be produced with a higher conversion and a higher yield.

In this invention, a Pd-based methanol synthesis catalyst component may be a silica support on which other components, in addition to Pd and a basic metal, are supported as long as the desired effects of the catalyst are maintained.

A Pd-based methanol synthesis catalyst component in which Pd, a basic metal or the like are supported on silica, may be prepared by a known method such as an impregnation method and a precipitation method.

(β-Zeolite Catalyst Component)

A β-zeolite catalyst component may be selected from β-zeolites which can act as a catalyst in a condensation reaction of methanol into a hydrocarbon and/or a condensation reaction of dimethyl ether into a hydrocarbon without limitation, and a commercially available β-zeolite can be used.

A pore in a β-zeolite is formed by a 12-membered oxygen ring with a pore size of about 0.66×0.76 nm.

A β-zeolite catalyst component may be selected from β-zeolites containing a metal such as alkali metals, alkaline earth metals and transition metals; β-zeolites ion-exchanged with these metals or the like; and β-zeolites on which these metals or the like are supported. But a preferable β-zeolite is a proton-type β-zeolite. By using a proton-type β-zeolite having a suitable acid strength and a suitable acidity (acid concentration), higher catalytic activity can be achieved and propane and/or butane can be produced with a higher conversion and a higher selectivity.

Also, as a β-zeolite catalyst component, a high-silica type β-zeolite is preferable; specifically, a β-zeolite with a $SiO_2/Al_2O_3$ molar ratio of 10 to 150. By using a β-zeolite with a $SiO_2/Al_2O_3$ molar ratio of 10 to 150 as a β-zeolite catalyst component, methanol produced can be converted into an olefin comprising propylene or butene as a main component, and further into a liquefied petroleum gas comprising propane or butane as a main component with a higher selectivity. A $SiO_2/Al_2O_3$ molar ratio of a β-zeolite is more preferably 20 or more, particularly preferably 30 or more. While a $SiO_2/Al_2O_3$ molar ratio of a β-zeolite is more preferably 100 or less, particularly preferably 50 or less.

A particularly preferable β-zeolite catalyst component is a proton-type β-zeolite with a $SiO_2/Al_2O_3$ molar ratio of 10 to 150, further preferably is a proton-type β-zeolite with a $SiO_2/Al_2O_3$ molar ratio of 30 to 50.

2. Process for Producing a Catalyst for Producing a Liquefied Petroleum Gas According to the Present Invention A catalyst for producing a liquefied petroleum gas according to this invention is preferably produced by separately preparing a Pd-based methanol synthesis catalyst component and a β-zeolite catalyst component, and then mixing them. By separately preparing a Pd-based methanol synthesis catalyst component and a β-zeolite catalyst component, a composition, a structure and a property of each component can be easily optimized for each function. Generally, a methanol synthesis catalyst requires to be basic, while a zeolite catalyst requires to be acidic. Thus, optimization for each function may be difficult when both catalyst components are prepared all together.

A Pd-based methanol synthesis catalyst component can be prepared by a known method. Some of Pd-based methanol synthesis catalysts must be activated by reduction treatment before use, including those containing Pd as an oxide, nitrate or chloride. In this invention, it is not necessarily required to activate a Pd-based methanol synthesis catalyst component by reduction treatment in advance. The Pd-based methanol synthesis catalyst component can be activated by reduction treatment of the catalyst for producing a liquefied petroleum gas of this invention, before the beginning of the reaction, after producing the catalyst by mixing a Pd-based methanol synthesis catalyst component and a β-zeolite catalyst component, and then molding the mixture.

The reduction treatment condition can be determined, depending on some factors such as the type of the Pd-based methanol synthesis catalyst component, as appropriate.

A β-zeolite catalyst component can be prepared by a known method, and a commercially available β-zeolite can be used. A β-zeolite catalyst component can be, if necessary, subjected to acid property adjustment by, for example, metal-ion-exchange, before mixing with a Pd-based methanol synthesis catalyst component.

A catalyst for producing a liquefied petroleum gas according to the present invention can be produced by homogeneously mixing a Pd-based methanol synthesis catalyst component and a β-zeolite catalyst component, and then, if necessary, molding the mixture. A procedure of mixing and molding these catalyst components is not particularly limited, but is preferably a dry method. When mixing and molding these catalyst components by a wet method, there may occur a compound transfer between these catalyst components, for example, neutralization due to transfer of a basic component in a Pd-based methanol synthesis catalyst component to an acidic site in a β-zeolite catalyst component, leading to the change of a property optimized for each function of these catalyst components, and the like. A catalyst can be molded by an appropriate method such as an extrusion and a tablet-compression.

In this invention, a Pd-based methanol synthesis catalyst component and a β-zeolite catalyst component to be mixed preferably have a large particle size to some extent, and are preferably not powdery but granular.

Herein, "powder" means to have an average particle size of 10 μm or less, while "granule" means to have an average particle size of 100 μm or more.

A catalyst for producing a liquefied petroleum gas according to the present invention may be prepared by mixing a granular Pd-based methanol synthesis catalyst component, which has an average particle size of 100 μm or more, and a granular β-zeolite catalyst component, which has an average particle size of 100 μm or more, and then, if necessary, molding the mixture, to give a catalyst having a further longer catalyst life with further less deterioration. Average particle sizes of a Pd-based methanol synthesis catalyst component and a β-zeolite catalyst component to be mixed are more preferably 200 μm or more, particularly preferably 500 μm or more.

On the other hand, in the light of maintaining the excellent performance of the mixed catalyst of this invention, average particle sizes of a Pd-based methanol synthesis catalyst component and a β-zeolite catalyst component to be mixed are preferably 5 mm or less, more preferably 2 mm or less.

It is preferable that a Pd-based methanol synthesis catalyst component and a β-zeolite catalyst component to be mixed have the same average particle size.

In general, when preparing a mixed catalyst, each catalyst component is, if necessary, mechanically pulverized to the same average particle size of, for example, about 0.5 to 2 μm, then homogeneously mixed and, if necessary, molded. Alternatively, all of intended catalyst components are put in a vessel, and mixed them, while mechanically pulverizing, until a homogeneous mixture is obtained with making an average particle size of, for example, about 0.5 to 2 μm, and then, if necessary, the mixture is molded.

In contrast, when preparing a catalyst for producing a liquefied petroleum gas according to this invention by mixing a granular Pd-based methanol synthesis catalyst component and a granular β-zeolite catalyst component, generally, each catalyst component is molded by a known molding method such as a tablet-compression and an extrusion, and, if necessary, mechanically pulverized to the same average particle size of preferably about 100 μm to 5 mm, and then these components are homogeneously mixed. Then, if necessary, the mixture is molded again to prepare a catalyst for producing a liquefied petroleum gas of this invention.

A catalyst for producing a liquefied petroleum gas according to the present invention may comprise other additive components as long as its intended effect would not be impaired, as necessary.

3. Process for Producing a Liquefied Petroleum Gas

Next, there will be described a process for producing a liquefied petroleum gas comprising propane or butane, preferably propane, as a main component by reacting carbon monoxide and hydrogen using a catalyst for producing a liquefied petroleum gas according to this invention as described above.

A reaction temperature is preferably 300° C. or higher, more preferably 320° C. or higher, particularly preferably 340° C. or higher. By controlling a reaction temperature within the above range, propane and/or butane can be produced with a higher conversion and a higher yield.

On the other hand, a reaction temperature is preferably 420° C. or lower, more preferably 400° C. or lower, in the light of the restrictive temperature for the use of the catalyst and easy removal or recovery of the reaction heat.

A reaction pressure is preferably 2.2 MPa or higher, more preferably 2.5 MPa or higher, particularly preferably 3 MPa or higher. By controlling a reaction pressure within the above range, propane and/or butane can be produced with a higher conversion and a higher yield, and the deterioration with time of the catalyst can be reduced further, so that propane and/or butane can be produced for a further longer period with a higher conversion and a higher yield. In particular, by controlling a reaction pressure to be 3 MPa or higher, propane and/or butane can be produced with a sufficiently high conversion and a sufficiently high yield.

On the other hand, a reaction pressure is preferably 10 MPa or lower, more preferably 7 MPa or lower, in the light of economical efficiency.

A gas space velocity is preferably 500 $hr^{-1}$ or more, more preferably 1500 $hr^{-1}$ or more, in the light of economical efficiency. In addition, a gas space velocity is preferably 10000 $hr^{-1}$ or less, more preferably 5000 $hr^{-1}$ or less, in order that each of a Pd-based methanol synthesis catalyst component and a β-zeolite catalyst component may give a contact time achieving a further sufficient conversion.

A concentration of carbon monoxide in a gas fed into a reactor is preferably 20 mol % or more, more preferably 25 mol % or more, in the light of ensuring a pressure (partial pressure) of carbon monoxide required for the reaction in a gas fed into the reactor, and improving a specific productivity of the materials. In addition, a concentration of carbon monoxide in a gas fed into a reactor is preferably 45 mol % or less, more preferably 40 mol % or less, in the light of a further sufficiently high conversion of carbon monoxide.

A concentration of hydrogen in a gas fed into a reactor is preferably 1.2 moles or more, more preferably 1.5 moles or more per one mole of carbon monoxide, in order that carbon monoxide may react more sufficiently. In addition, a concentration of hydrogen in a gas fed into a reactor is preferably 3 moles or less, more preferably 2.5 moles or less per one mole of carbon monoxide, in the light of economical efficiency. In some cases, preferably, a concentration of hydrogen in a gas fed into a reactor may be reduced to about 0.5 moles per one mole of carbon monoxide.

A gas fed into a reactor may contain carbon dioxide in addition to carbon monoxide and hydrogen, which are starting materials of the reaction. By recycling carbon dioxide discharged from the reactor, or by adding the corresponding amount of carbon dioxide, formation of carbon dioxide from carbon monoxide by a shift reaction in the reactor can be substantially reduced or be eliminated.

A gas fed into a reactor can contain water vapor. And a gas fed into a reactor can contain an inert gas.

A gas fed into a reactor can be dividedly fed to the reactor so as to control a reaction temperature.

The reaction can be conducted in a fixed bed, a fluid bed, a moving bed or the like, and can be preferably selected, taking both of control of a reaction temperature and a regeneration method of the catalyst into account. For example, a fixed bed may include a quench type reactor such as an internal multistage quench type, a multitubular type reactor, a multistage type reactor having a plurality of internal heat exchangers or the like, a multistage cooling radial flow type, a double pipe heat exchange type, an internal cooling coil type, a mixed flow type, and other types of reactors.

When used, a catalyst for producing a liquefied petroleum gas according to the present invention can be diluted with silica, alumina or an inert and stable heat conductor for controlling a temperature. In addition, when used, a catalyst for producing a liquefied petroleum gas according to the present invention can be applied to the surface of a heat exchanger for controlling a temperature.

4. Process for Producing a Liquefied Petroleum Gas from a Carbon-Containing Starting Material In this invention, a synthesis gas can be used as a starting gas for producing a liquefied petroleum gas (LPG).

Next, there will be described an embodiment of a process for producing LPG according to this invention, comprising the steps of producing a synthesis gas from a carbon-containing starting material (synthesis gas production process) and then producing LPG from the obtained synthesis gas using a catalyst of this invention (liquefied petroleum gas production process).

<Synthesis Gas Production Process>

In a synthesis gas production process, a synthesis gas is produced from a carbon-containing starting material and at least one selected from the group consisting of $H_2O$, $O_2$ and $CO_2$.

A carbon-containing substance which can react with at least one selected from the group consisting of $H_2O$, $O_2$ and $CO_2$ to form $H_2$ and CO, can be used as a carbon-containing starting material. A substance known as a raw material for a synthesis gas can be used as a carbon-containing starting material; for example, lower hydrocarbons such as methane and ethane, a natural gas, a naphtha, a coal, and the like can be used.

Since a catalyst is generally used in a synthesis gas production process and a liquefied petroleum gas production process in this invention, a carbon-containing starting material (a natural gas, a naphtha, a coal and so on) preferably contains less catalyst poisoning components such as sulfur and a sulfur compound. When a carbon-containing starting material contains a catalyst poisoning component, a step of removing the catalyst poisoning component such as devulcanization can be conducted before a synthesis gas production process, if necessary.

A synthesis gas can be produced by reacting the above carbon-containing starting material with at least one selected from the group consisting of $H_2O$, $O_2$ and $CO_2$ in the presence of a catalyst for producing a synthesis gas (reforming catalyst).

A synthesis gas can be produced by a known method. When a natural gas (methane) is used as a starting material, for example, a synthesis gas can be produced by a water-vapor reforming method, an autothermal reforming method or the like. In these methods, water vapor required for a water-vapor reforming, oxygen required for an autothermal reforming, or the like can be fed, if necessary. When a coal is used as a starting material, a synthesis gas can be produced using an aerating gasification furnace.

For example, a shift reactor may be placed downstream of a reformer, which is a reactor for producing a synthesis gas from the above starting materials, so that a synthesis gas composition can be adjusted by a shift reaction ($CO+H_2O \rightarrow CO_2+H_2$).

In this invention, a preferable composition of a synthesis gas produced in a synthesis gas production process is a molar ratio of $H_2/CO$ is $7/3 \cong 2.3$ in terms of the stoichiometry for a lower paraffin production, and a ratio of hydrogen to carbon monoxide ($H_2/CO$; by mole) in a synthesis gas produced is preferably 1.2 to 3. A ratio of hydrogen to carbon monoxide ($H_2/CO$; by mole) in a synthesis gas is preferably 1.2 or more, more preferably 1.5 or more, in order that carbon monoxide may react suitably, since hydrogen is generated by a shift reaction caused by water generated in a conversion reaction from a synthesis gas to LPG. It is only necessary to feed hydrogen in such an amount that carbon monoxide can react suitably to form a liquefied petroleum gas comprising propane or butane as a main component, and excessive hydrogen may increase the total pressure of a starting gas unnecessarily, leading to a lower economical efficiency. Thus, a ratio of hydrogen to carbon monoxide ($H_2/CO$; by mole) in a synthesis gas is preferably 3 or less, more preferably 2.5 or less.

A concentration of carbon monoxide in a synthesis gas produced is preferably 20 mol % or more, more preferably 25 mol % or more, in the light of ensuring a pressure (partial pressure) of carbon monoxide suitable for a conversion reaction from a synthesis gas to LPG, and improving a specific productivity of the materials. In addition, a concentration of carbon monoxide in a synthesis gas produced is preferably 45 mol % or less, more preferably 40 mol % or less, in the light of a further sufficiently high conversion of carbon monoxide in a conversion reaction from a synthesis gas to LPG.

A synthesis gas having the above composition can be produced by appropriately selecting reaction conditions such as a feeding ratio of a carbon-containing starting material and at least one material selected from the group consisting of steam (water), oxygen and carbon dioxide, a kind of a catalyst for producing a synthesis gas used, and others.

For example, a synthesis gas can be produced using a gas whose composition is steam/methane (molar ratio) of 1 and carbon dioxide/methane (molar ratio) of 0.4 as a starting gas under the operation conditions of a reaction temperature (an outlet temperature of a catalyst layer) of 800 to 900° C., a reaction pressure of 1 to 4 MPa, a gas space velocity (GHSV) of 20000 hr$^{-1}$, in an external heating multitubular tubular reactor type apparatus filled with a catalyst, a Ru or Rh/a magnesia made the surface area smaller by sintering.

When using steam for reforming in a synthesis gas production, a ratio of steam/raw material carbon (S/C) is preferably 1.5 or less, more preferably 0.8 to 1.2, in the light of an energy efficiency. But such a low S/C value may lead to the considerable possibility of carbon precipitation formation.

When producing a synthesis gas with a low S/C, it may be preferable to use a catalyst which have a good activity of forming a synthesis gas and a low activity of forming a carbon precipitation, as described in, for example, WO 98/46524, Japanese Patent Laid-open Publication No. 2000-288394 and Japanese Patent Laid-open Publication No. 2000-469. Hereinafter, such a catalyst will be described.

The catalyst described in WO 98/46524 is a catalyst in which at least one catalyst metal selected from rhodium, ruthenium, iridium, palladium and platinum is supported on a support composed of a metal oxide, having a specific surface area of 25 m$^2$/g or less, an electronegativity of a metal ion in the support metal oxide of 13.0 or less, and the amount of the supported catalyst metal of 0.0005 to 0.1 mol % to the support metal oxide in terms of metal. In the light of prevention of carbon precipitation, the electronegativity is preferably 4 to 12 and the specific surface area of the catalyst is preferably 0.01 to 10 m$^2$/g.

An electronegativity of a metal ion in the metal oxide can be defined by the following equation:

$$Xi=(1+2i)Xo$$

wherein Xi represents an electronegativity of the metal ion; Xo represents an electronegativity of the metal; and i represents an electronic number of the metal ion.

When the metal oxide is a composite metal oxide, an average electronegativity of the metal ions is used, and the value is the sum total of electronegativity of the each metal ion in the composite metal oxide multiplied by a mole fraction of each oxide.

An electronegativity of a metal (Xo) is a Pauling's electronegativity. Pauling's electronegativities are listed in Table 15.4 in "Moore Physical Chemistry (latter volume) (4th edition), translated by Ryoichi Fujishiro, Tokyo Kagaku Dojin, p. 707 (1974)". An electronegativity of a metal ion (Xi) in a metal oxide is detailed in, for example, "Shokubai Koza, Vol. 2, ed. the Catalysis Society of Japan, p. 145 (1985)".

Examples of the metal oxide in this catalyst include those containing at least one metal such as Mg, Ca, Ba, Zn, Al, Zr and La. An example of such a metal oxide is magnesia (MgO).

In a process in which methane and steam are reacted (steam reforming), the reaction is represented by the following formula (i):

$$CH_4+H_2O \leftrightarrows 3H_2+CO \quad (i)$$

In a process in which methane and carbon dioxide are reacted ($CO_2$ reforming), the reaction is represented by the following formula (ii):

$$CH_4+CO_2 \leftrightarrows 2H_2+2CO \quad (ii)$$

In a process in which methane, steam and carbon dioxide are reacted (steam/$CO_2$ mixed reforming), the reaction is represented by the following formula (iii):

$$3CH_4+2H_2O+CO_2 \leftrightarrows 8H_2+4CO \quad (iii)$$

For steam reforming using the above catalyst, a reaction temperature is preferably 600 to 1200° C., more preferably 600 to 1000° C., and a reaction pressure is preferably 0.098 MPaG to 3.9 MPaG, more preferably 0.49 MPaG to 2.9 MPaG (G indicates that a value is a gauge pressure). When the steam reforming is conducted with a fixed bed, a gas space velocity (GHSV) is preferably 1,000 to 10,000 hr$^{-1}$, more preferably 2,000 to 8,000 hr$^{-1}$. A rate of steam to a carbon-containing starting material is preferably 0.5 to 2 moles, more preferably 0.5 to 1.5 moles, further preferably 0.8 to 1.2 moles of steam (H$_2$O) per one mole of carbon in the carbon-containing starting material (excluding CO$_2$).

For CO$_2$ reforming using the above catalyst, a reaction temperature is preferably 500 to 1200° C., more preferably 600 to 1000° C., and a reaction pressure is preferably 0.49 MPaG to 3.9 MPaG, more preferably 0.49 MPaG to 2.9 MPaG. When the CO$_2$ reforming is conducted with a fixed bed, a gas space velocity (GHSV) is preferably 1,000 to 10,000 hr$^{-1}$, more preferably 2,000 to 8,000 hr$^{-1}$. A rate of CO$_2$ to a carbon-containing starting material is preferably 20 to 0.5 moles, more preferably 10 to 1 moles of CO$_2$ per one mole of carbon in the carbon-containing starting material (excluding CO$_2$).

When a carbon-containing starting material is reacted with a mixture of steam and CO$_2$ using the above catalyst to produce a synthesis gas (steam/CO$_2$ mixed reforming is conducted), there are no restrictions to a ratio of steam to CO$_2$, but generally a ratio of H$_2$O/CO$_2$ (molar ratio) is 0.1 to 10. A reaction temperature is preferably 550 to 1200° C., more preferably 600 to 1000° C., and a reaction pressure is preferably 0.29 MPaG to 3.9 MPaG, more preferably 0.49 MPaG to 2.9 MPaG. When the reaction is conducted with a fixed bed, a gas space velocity (GHSV) is preferably 1,000 to 10,000 hr$^{-1}$, more preferably 2,000 to 8,000 hr$^{-1}$. A rate of steam to a carbon-containing starting material is preferably 0.5 to 2 moles, more preferably 0.5 to 1.5 moles of steam (H$_2$O), further preferably 0.5 to 1.2 moles per one mole of carbon in the carbon-containing starting material (excluding CO$_2$).

The catalyst described in Japanese Patent Laid-open Publication No. 2000-288394 is composed of a composite oxide having a composition represented by the following formula (I), characterized in that M$^1$ and Co are highly dispersed in the composite oxide:

$$a^1 M^1 \cdot b^1 Co \cdot c^1 Mg \cdot d^1 Ca \cdot e^1 O \tag{I}$$

wherein a$^1$, b$^1$, c$^1$, d$^1$ and e$^1$ are mole fractions, provided that a$^1$+b$^1$+c$^1$+d$^1$=1, 0.0001≦a$^1$≦0.10, 0.0001≦b$^1$≦0.20, 0.70≦(c$^1$+d$^1$)≦0.9998, 0<c$^1$≦0.9998, 0≦d$^1$<0.9998, and e$^1$ is a number required for maintaining the charge balance of the elements and oxygen;

M$^1$ is at least one element selected from Group 6A elements, Group 7A elements, Group 8 transition elements except Co, Group 1B elements, Group 2B elements, Group 4B elements and lanthanoid elements in the Periodic Table.

The catalyst described in Japanese Patent Laid-open Publication No. 2000-469 is composed of a composite oxide having a composition represented by the following formula (II), characterized in that M$^2$ and Ni are highly dispersed in the composite oxide:

$$a^2 M^2 \cdot b^2 Ni \cdot c^2 Mg \cdot d^2 Ca \cdot e^2 O \tag{II}$$

wherein a$^2$, b$^2$, c$^2$, d$^2$ and e$^2$ are mole fractions, provided that a$^2$+b$^2$+c$^2$+d$^2$=1, 0.0001≦a$^2$≦0.10, 0.0001≦b$^2$≦0.10, 0.80≦(c$^2$+d$^2$)≦0.9998, 0<c$^2$≦0.9998, 0≦d$^2$<0.9998, and e$^2$ is a number required for maintaining the charge balance of the elements and oxygen;

M$^2$ is at least one element selected from Group 3B elements, Group 4A elements, Group 6B elements, Group 7B elements, Group 1A elements and lanthanoid elements in the Periodic Table.

These catalysts can be also used in the same way as described in WO 98/46524.

A reforming reaction of a carbon-containing starting material, i.e., a reaction for producing a synthesis gas, is limited to the above methods, and can be conducted in accordance with any of other known methods. A reforming reaction of a carbon-containing starting material can be conducted in various types of reactors, but is preferably conducted in a fixed bed or a fluid bed.

<Liquefied Petroleum Gas Production Process>

In a liquefied petroleum gas production process, a lower-paraffin-containing gas, which comprises propane or butane as a main component of the hydrocarbon contained therein, is produced from the synthesis gas obtained in the above synthesis gas production process, by using a catalyst for producing a liquefied petroleum gas according to the present invention. And then, water is separated from the lower-paraffin-containing gas produced, as necessary, and subsequently a low-boiling component having a lower boiling point or a lower sublimation point than the boiling point of propane (unreacted starting materials, hydrogen and carbon monoxide; by-products, carbon dioxide, ethane, ethylene and methane; and so on) and a high-boiling component having a higher boiling point than the boiling point of butane (by-products, high-boiling paraffin gases) are, if necessary, separated from the lower-paraffin-containing gas, so as to obtain a liquefied petroleum gas (LPG) comprising propane or butane as a main component. If necessary, the gas may be pressurized and/or cooled so as to obtain a liquefied petroleum gas.

In a liquefied petroleum gas production process, carbon monoxide and hydrogen are reacted in the presence of the above catalyst for producing a liquefied petroleum gas of this invention, to produce a paraffin comprising propane or butane as a main component, preferably a paraffin comprising propane as a main component.

In this case, a gas fed into a reactor is the synthesis gas produced in the above synthesis gas production process. The gas fed into a reactor may contain, in addition to carbon monoxide and hydrogen, other components such as carbon dioxide, water, methane, ethane, ethylene and an inert gas. The gas fed into a reactor may be a gas obtained by adding carbon monoxide, hydrogen or other components, if necessary, to the synthesis gas produced in the above synthesis gas production process. And the gas fed into a reactor may be a gas obtained by separating a certain component, as necessary, from the synthesis gas produced in the above synthesis gas production process.

A gas fed into a reactor may comprise carbon dioxide, in addition to carbon monoxide and hydrogen, which are starting materials for producing a lower paraffin. As the carbon dioxide, by recycling carbon dioxide discharged from the reactor, or by using the corresponding amount of carbon dioxide, formation of carbon dioxide from carbon monoxide by a shift reaction in the reactor can be substantially reduced or be eliminated.

A gas fed into a reactor may comprise water vapor.

As described above, a reaction temperature is preferably 300° C. or higher, more preferably 320° C. or higher, particularly preferably 340° C. or higher. On the other hand, as described above, a reaction temperature is preferably 420° C. or lower, more preferably 400° C. or lower.

As described above, a reaction pressure is preferably 2.2 MPa or higher, more preferably 2.5 MPa or higher, particularly preferably 3 MPa or higher. On the other hand, as described above, a reaction pressure is preferably 10 MPa or lower, more preferably 7 MPa or lower.

As described above, a gas space velocity is preferably 500 hr$^{-1}$ or more, more preferably 1500 hr$^{-1}$ or more. On the other hand, as described above, a gas space velocity is preferably 10000 hr$^{-1}$ or less, more preferably 5000 hr$^{-1}$ or less.

A gas fed into a reactor can be dividedly fed to the reactor so as to control a reaction temperature.

The reaction can be conducted in a fixed bed, a fluid bed, a moving bed or the like, and can be preferably selected, taking both of control of a reaction temperature and a regeneration method of the catalyst into account. For example, a fixed bed may include a quench type reactor such as an internal multistage quench type, a multitubular type reactor, a multistage type reactor having a plurality of internal heat exchangers or the like, a multistage cooling radial flow type, a double pipe heat exchange type, an internal cooling coil type, a mixed flow type, and other types of reactors.

When used, a catalyst for producing a liquefied petroleum gas according to the present invention can be diluted with silica, alumina or an inert and stable heat conductor for controlling a temperature. In addition, when used, a catalyst for producing a liquefied petroleum gas according to the present invention can be applied to the surface of a heat exchanger for controlling a temperature.

A lower-paraffin-containing gas produced in the liquefied petroleum gas production process comprises a hydrocarbon containing propane or butane as a main component. In the light of liquefaction properties, it is preferable that the total content of propane and butane is higher in a lower-paraffin-containing gas. According to this invention, there can be obtained a lower-paraffin-containing gas having a content of propane and butane of 50 mol % or more, preferably 60 mol % or more, more preferably 70 mol % or more (including 100 mol %) to the hydrocarbon contained therein, in total.

Furthermore, a lower-paraffin-containing gas produced in the liquefied petroleum gas production process preferably contains more propane in comparison with butane, in the light of inflammability and vapor pressure properties.

A lower-paraffin-containing gas produced in a liquefied petroleum gas production process generally comprises water; a low-boiling component having a lower boiling point or a lower sublimation point than the boiling point of propane; and a high-boiling component having a higher boiling point than the boiling point of butane. Examples of a low-boiling component include ethane, methane and ethylene, which are by-products; carbon dioxide which is formed by a shift reaction; and hydrogen and carbon monoxide, which are unreacted starting materials. Examples of a high-boiling component include high-boiling paraffins (e.g., pentane, hexane and so on), which are by-products.

Thus, water, a low-boiling component and a high-boiling component are, as necessary, separated from a lower-paraffin-containing gas produced, so as to obtain a liquefied petroleum gas (LPG) comprising propane or butane as a main component.

Separation of water, a low-boiling component or a high-boiling component can be conducted in accordance with a known method.

Water can be separated by, for example, liquid-liquid separation.

A low-boiling component can be separated by, for example, gas-liquid separation, absorption separation or distillation; more specifically, gas-liquid separation at an ambient temperature under increased pressure, absorption separation at an ambient temperature under increased pressure, gas-liquid separation with cooling, absorption separation with cooling, or combination thereof. Alternatively, for this purpose, membrane separation or adsorption separation can be conducted, or these in combination with gas-liquid separation, absorption separation or distillation can be conducted. A gas recovery process commonly employed in an oil factory (described in "Oil Refining Processes", ed. The Japan Petroleum Institute, Kodansha Scientific, 1998, pp. 28-32) can be applied to separation of a low-boiling component.

A preferable method of separation of a low-boiling component is an absorption process where a liquefied petroleum gas comprising propane or butane as a main component is absorbed into an absorbent liquid such as a high-boiling paraffin gas having a higher boiling point than butane, and a gasoline.

A high-boiling component can be separated by, for example, gas-liquid separation, absorption separation or distillation.

For consumer use, it is preferable that a content of a low-boiling component in the LPG is reduced to 5 mol % or less (including 0 mol %) by separation, for example, in the light of safety in use.

The total content of propane and butane in the LPG thus produced may be 90 mol % or more, more preferably 95 mol % or more (including 100 mol %). And a content of propane in the LPG produced may be 50 mol % or more, more preferably 60 mol % or more (including 100 mol %). Thus, according to this invention, LPG having a composition suitable for a propane gas, which is widely used as a fuel for household and business use, can be produced.

In this invention, a low-boiling component separated from the lower-paraffin-containing gas can be recycled as a starting material for the synthesis gas production process.

A low-boiling component separated from the lower-paraffin-containing gas includes substances which can be recycled as starting materials for a synthesis gas production process; for example, methane, ethane, ethylene and so on. And carbon dioxide in the low-boiling component can be back to a synthesis gas by a $CO_2$ reforming reaction. In addition, a low-boiling component includes unreacted starting materials such as hydrogen and carbon monoxide. Therefore, the low-boiling component separated from the lower-paraffin-containing gas may be recycled as a starting material for a synthesis gas production process, leading to reduce a specific productivity of the materials.

The whole low-boiling components separated from a lower-paraffin-containing gas can be recycled to a synthesis gas production process. Alternatively, part of the low-boiling components may be removed outside the system, while the rest of low-boiling components may be recycled to a synthesis gas production process. Low-boiling components can be recycled to a synthesis gas production process after separating only desired components.

In a synthesis gas production process, a content of a low-boiling component in a gas fed into a reformer, which is a reactor; in other words, a content of a recycled material may be determined as appropriate, and it may be, for example, 40 to 75 mol %.

For the purpose of recycling a low-boiling component, a known technique, e.g., appropriately providing a recycle line with a pressurization means can be employed.

<Process for Producing LPG>

Next, there will be described an embodiment of a process for producing LPG according to this invention with reference to the drawing.

FIG. 1 shows an embodiment of an LPG production apparatus suitable for carrying out a production process for LPG according to this invention.

First, a natural gas (methane) as a carbon-containing starting material is fed into a reformer 1 via a line 3. And, for steam reforming, steam (not shown) is also fed into the line 3. In the reformer 1, there is a reforming catalyst layer 1a comprising a reforming catalyst (a catalyst for producing a synthesis gas). The reformer 1 also has a heating means for supplying heat required for reforming (not shown). In the reformer 1, methane is reformed in the presence of the reforming catalyst to produce a synthesis gas containing hydrogen and carbon monoxide.

The synthesis gas thus produced is fed into a reactor 2 via a line 4. In the reactor 2, there is a catalyst layer 2a comprising a catalyst of this invention. In the reactor 2, a hydrocarbon gas containing propane or butane as a main component (a lower-paraffin-containing gas) is produced from the synthesis gas in the presence of the catalyst of this invention.

The hydrocarbon gas thus produced is pressurized and cooled, after optional removal of water or the like, and LPG, which is a product, is obtained from a line 5. Optionally, hydrogen and the like may be removed from the LPG by, for example, gas-liquid separation.

The LPG production apparatus may be, as necessary, provided with a booster, a heat exchanger, a valve, an instrumentation controller and so on, which are not shown.

Alternatively, a gas obtained by adding carbon dioxide or the like to the synthesis gas produced in the reformer 1 may be fed into the reactor 2. And, a gas obtained by adding additional hydrogen or carbon monoxide to the synthesis gas produced in the reformer 1, or a gas obtained by adjusting its composition by a shift reaction, may be fed into the reactor 2.

Water, a low-boiling component, a high-boiling component, and so on may be separated from the hydrocarbon gas obtained from the reactor 2, by a known method. The low-boiling component separated from the hydrocarbon gas may be recycled into the reformer 1 as a starting material for the synthesis gas production process (reforming process).

EXAMPLES

The following will describe the present invention in more detail with reference to Examples. However, the present invention is not limited to these Examples.

Example 1

(Preparation of a Catalyst)

A mechanically powdered catalyst in which 4 wt % of Pd and 0.75 wt % of Ca were supported on silica (Pd—Ca/SiO$_2$; average particle size: 0.7 μm) was used as a Pd-based methanol synthesis catalyst component. The catalyst was prepared as follows.

The silica, which is a support for the Pd-based methanol synthesis catalyst component, was CARiACT G3 (trade name), produced by Fuji Silysia Chemical Ltd. The silica had a specific surface area of 820 m$^2$/g and an average pore size of 2.2 nm, respectively, as determined by a BET method with N$_2$ as an adsorption gas, using ASAP2010 (Shimadzu Corporation).

The silica, which is a support, was pulverized to 20 to 40 mesh, sized and dried. And then, 8.8 mL of a 50 mg/mL aqueous solution of Pd(NO$_3$)$_2$(NH$_3$)$_2$ was added drop by drop to 20 g of the silica. After sufficiently impregnating the solution into pores, the silica was dried in a drying machine at 120° C. for 12 hours. The process of impregnation and drying was repeated two more times to obtain a silica-supported Pd catalyst.

Next, 3.0 mL of a 25 mg/mL aqueous solution of Ca(NO$_3$)$_2$ was added drop by drop to the silica-supported Pd catalyst. After sufficiently impregnating the solution into pores, the catalyst was dried in a drying machine at 120° C. for 12 hours. The process of impregnation and drying was repeated two more times.

Then, the silica impregnated with Pd and Ca was calcined at 450° C. in the atmosphere for 8 hours. Subsequently, it was mechanically pulverized to give a Pd-based methanol synthesis catalyst component.

A mechanically powdered commercially available proton-type β-zeolite with a SiO$_2$/Al$_2$O$_3$ molar ratio of 37.1, produced by Tosoh Corporation, (average particle size: 0.7 μm) was used as a β-zeolite catalyst component.

The Pd-based methanol synthesis catalyst component thus prepared and the β-zeolite catalyst component were homogeneously mixed with Pd—Ca/SiO$_2$:β-zeolite=2:1 (by weight). And, the mixture was molded by a tablet-compression and sized to give a granular molded catalyst having an average particle size of 1 mm.

(Production of LPG)

In a tubular reactor with an inner diameter of 6 mm was placed 1 g of the catalyst prepared as above, and the catalyst was reduced under a hydrogen stream at 400° C. for 3 hours before the beginning of the reaction.

After reduction treatment of the catalyst, a starting gas consisting of 66.7 mol % of hydrogen and 33.3 mol % of carbon monoxide (H$_2$/CO=2 (molar ratio)) was passed through the catalyst layer at a reaction temperature of 375° C., a reaction pressure of 4.1 MPa and a gas space velocity of 2000 hr$^{-1}$ (W/F=9.0 g·h/mol) to carry out the LPG production reaction. Gas chromatographic analysis of the product indicated that, after three hours from the beginning of the reaction, a conversion of carbon monoxide was 74.1%, a shift reaction conversion of carbon monoxide to carbon dioxide was 33.3%, and a conversion of carbon monoxide to a hydrocarbon was 40.7%. The produced hydrocarbon gas contained propane and butane in 75.2% on the basis of carbon, which consisted of 56.6% of propane and 43.3% of butane on the basis of carbon. And, after twenty-eight hours from the beginning of the reaction, a conversion of carbon monoxide was 59.4%, a shift reaction conversion of carbon monoxide to carbon dioxide was 28.2%, and a conversion of carbon monoxide to a hydrocarbon was 31.2%. The produced hydrocarbon gas contained propane and butane in 74.0% on the basis of carbon, which consisted of 51.6% of propane and 48.4% of butane on the basis of carbon.

Figure 2:
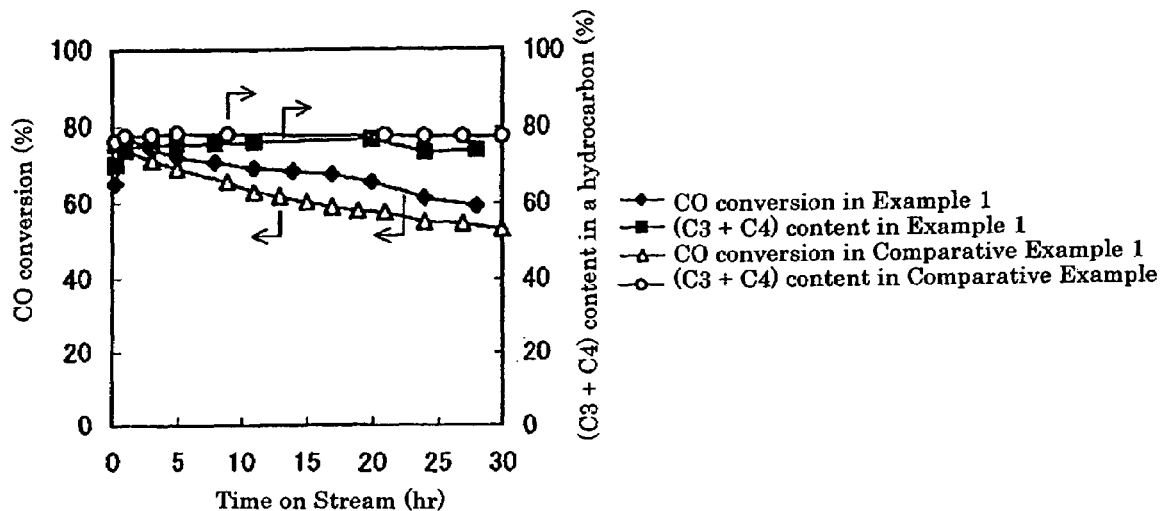
FIG. 2 is a graph showing the change in the conversion of carbon monoxide and the total content of propane and butane in the produced hydrocarbon gas with time in Example 1 and Comparative Example 1.

The results are shown in Table 1. FIG. 2 shows the change in the conversion of carbon monoxide and the total content of propane and butane in the produced hydrocarbon gas with time.

Comparative Example 1

(Preparation of a Catalyst)

A mechanically powdered commercially available Cu—Zn-based methanol synthesis catalyst, C79 produced by Sud Chemie Japan, Inc., (also referred to as "Cu—Zn"; average particle size: 0.7 μm) was used as a methanol synthesis catalyst component.

A mechanically powdered commercially available proton-type USY zeolite with a SiO$_2$/Al$_2$O$_3$ molar ratio of 12.2, produced by Catalysts & Chemicals Industries Co., Ltd., (average particle size: 0.7 μm) was used as a zeolite catalyst component.

The methanol synthesis catalyst component and the zeolite catalyst component were homogeneously mixed with Cu—Zn:USY zeolite=1:1 (by weight). And, the mixture was molded by a tablet-compression and sized in the same way as Example 1, to give a granular molded catalyst having an average particle size of 1 mm.

(Production of LPG)

In a tubular reactor with an inner diameter of 6 mm was placed 1 g of the catalyst prepared as above, and the catalyst was reduced under a hydrogen stream at 400° C. for 3 hours before the beginning of the reaction.

After reduction treatment of the catalyst, a starting gas consisting of 66.7 mol % of hydrogen and 33.3 mol % of carbon monoxide ($H_2/CO=2$ (molar ratio)) was passed through the catalyst layer at a reaction temperature of 330° C., a reaction pressure of 2.1 MPa and a gas space velocity of 2000 $hr^{-1}$ (W/F=4.5 g·h/mol) to carry out the LPG production reaction. Gas chromatographic analysis of the product indicated that, after three hours from the beginning of the reaction, a conversion of carbon monoxide was 71.1%, a shift reaction conversion of carbon monoxide to carbon dioxide was 32.9%, and a conversion of carbon monoxide to a hydrocarbon was 35.0%. The produced hydrocarbon gas contained propane and butane in 77.7% on the basis of carbon, which consisted of 37.6% of propane and 62.3% of butane on the basis of carbon. And, after twenty-seven hours from the beginning of the reaction, a conversion of carbon monoxide was 54.8%, a shift reaction conversion of carbon monoxide to carbon dioxide was 25.5%, and a conversion of carbon monoxide to a hydrocarbon was 27.1%. The produced hydrocarbon gas contained propane and butane in 77.5% on the basis of carbon, which consisted of 32.4% of propane and 67.6% of butane on the basis of carbon.

The results are shown in Table 1. FIG. 2 shows the change in the conversion of carbon monoxide and the total content of propane and butane in the produced hydrocarbon gas with time.

As described above, the reaction conditions such as a reaction temperature were different from those in Example 1, because the optimal conditions for the used catalyst were selected.

Comparative Example 2

(Preparation of a Catalyst)

A Pd-based methanol synthesis catalyst component prepared in the same way as Example 1, i.e., a mechanically powdered catalyst in which 4 wt % of Pd and 0.75 wt % of Ca were supported on silica, which was CARiACT G3 (trade name) produced by Fuji Silysia Chemical Ltd., (Pd—Ca/$SiO_2$; average particle size: 0.7 μm) was used as a methanol synthesis catalyst component.

A mechanically powdered commercially available proton-type USY zeolite with a $SiO_2/Al_2O_3$ molar ratio of 12.2, produced by Catalysts & Chemicals Industries Co., Ltd., (average particle size: 0.7 μm) was used as a zeolite catalyst component.

The methanol synthesis catalyst component thus prepared and the zeolite catalyst component were homogeneously mixed with Pd—Ca/$SiO_2$:USY zeolite=2:1 (by weight). And, the mixture was molded by a tablet-compression and sized in the same way as Example 1, to give a granular molded catalyst having an average particle size of 1 mm.

(Production of LPG)

In a tubular reactor with an inner diameter of 6 mm was placed 1 g of the catalyst prepared as above, and the catalyst was reduced under a hydrogen stream at 400° C. for 3 hours before the beginning of the reaction.

After reduction treatment of the catalyst, a starting gas consisting of 66.7 mol % of hydrogen and 33.3 mol % of carbon monoxide ($H_2/CO=2$ (molar ratio)) was passed through the catalyst layer at a reaction temperature of 375° C., a reaction pressure of 5.1 MPa and a gas space velocity of 2000 $hr^{-1}$ (W/F=9.0 g·h/mol) to carry out the LPG production reaction. Gas chromatographic analysis of the product indicated that, after three hours from the beginning of the reaction, a conversion of carbon monoxide was 59.2%, a shift reaction conversion of carbon monoxide to carbon dioxide was 25.1%, and a conversion of carbon monoxide to a hydrocarbon was 33.9%. The produced hydrocarbon gas contained propane and butane in 62.8% on the basis of carbon, which consisted of 56.1% of propane and 43.9% of butane on the basis of carbon.

The results are shown in Table 1.

Comparative Example 3

(Preparation of a Catalyst)

A Pd-based methanol synthesis catalyst component prepared in the same way as Example 1, i.e., a mechanically powdered catalyst in which 4 wt % of Pd and 0.75 wt % of Ca were supported on silica, which was CARiACT G3 (trade name) produced by Fuji Silysia Chemical Ltd., (Pd—Ca/$SiO_2$; average particle size: 0.7 μm) was used as a methanol synthesis catalyst component.

A mechanically powdered commercially available proton-type USY zeolite with a $SiO_2/Al_2O_3$ molar ratio of 30.0, produced by Catalysts & Chemicals Industries Co., Ltd., (average particle size:0.7 μm) was used as a zeolite catalyst component.

The methanol synthesis catalyst component thus prepared and the zeolite catalyst component were homogeneously mixed with Pd—Ca/$SiO_2$:USY zeolite=2:1 (by weight). And, the mixture was molded by a tablet-compression and sized in the same way as Example 1, to give a granular molded catalyst having an average particle size of 1 mm.

(Production of LPG)

In a tubular reactor with an inner diameter of 6 mm was placed 1 g of the catalyst prepared as above, and the catalyst was reduced under a hydrogen stream at 400° C. for 3 hours before the beginning of the reaction.

After reduction treatment of the catalyst, a starting gas consisting of 66.7 mol % of hydrogen and 33.3 mol % of carbon monoxide ($H_2/CO=2$ (molar ratio)) was passed through the catalyst layer at a reaction temperature of 375° C., a reaction pressure of 5.1 MPa and a gas space velocity of 2000 $hr^{-1}$ (W/F=9.0 g·h/mol) to carry out the LPG production reaction. Gas chromatographic analysis of the product indicated that, after three hours from the beginning of the reaction, a conversion of carbon monoxide was 87.6%, a shift reaction conversion of carbon monoxide to carbon dioxide was 34.4%, and a conversion of carbon monoxide to a hydrocarbon was 52.9%. The produced hydrocarbon gas contained propane and butane in 66.6% on the basis of carbon, which consisted of 57.8% of propane and 42.2% of butane on the basis of carbon.

The results are shown in Table 1.

TABLE 1

|  | Example 1 | | Comp. Exam. 1 | | Comp. Exam. 2 | Comp. Exam. 3 |
| --- | --- | --- | --- | --- | --- | --- |
| Reaction temperature (° C.) | 375 | | 330 | | 375 | 375 |
| Reaction pressure (MPa) | 4.1 | | 2.1 | | 5.1 | 5.1 |
| Time on Stream (hr) | 3 | 28 | 3 | 27 | 3 | 3 |
| CO conversion (%) | 74.1 | 59.4 | 71.1 | 54.8 | 59.2 | 87.6 |
| $CO_2$ yield (%) | 33.3 | 28.2 | 32.9 | 25.5 | 25.1 | 34.4 |
| Hydrocarbon yield (%) | 40.7 | 31.2 | 35.0 | 27.1 | 33.9 | 52.9 |
| Product composition (%) | | | | | | |
| C1(methane) | 7.2 | 4.5 | 4.0 | 3.7 | 7.9 | 9.9 |
| C2(ethane) | 8.5 | 8.6 | 6.3 | 4.4 | 18.0 | 17.8 |
| C3(propane) | 42.6 | 38.2 | 29.2 | 25.1 | 35.2 | 38.5 |
| C4(butane) | 32.6 | 35.8 | 48.6 | 52.4 | 27.6 | 28.0 |
| C5(pentane) | 7.1 | 10.1 | 8.5 | 9.9 | 9.0 | 4.6 |
| C6(hexane) | 1.9 | 2.7 | 2.7 | 3.2 | 2.2 | 1.1 |
| C7(heptane) | 0.1 | 0.2 | 0.8 | 1.3 | 0.1 | 0.0 |
| C3 + C4 | 75.2 | 74.0 | 77.7 | 77.5 | 62.8 | 66.6 |
| C3/(C3 + C4) | 56.6 | 51.6 | 37.6 | 32.4 | 56.1 | 57.8 |

As seen in Table 1 and FIG. 2, Example 1 employing the catalyst of this invention consisting of Pd—Ca/$SiO_2$ and the β-zeolite exhibited a equivalent selectivity for propane and butane and less decrease in activity, i.e., less deterioration of the catalyst, in comparison with Comparative Example 1 employing the catalyst consisting of the Cu—Zn-based methanol synthesis catalyst and the USY zeolite (Y-type zeolite).

When a Cu—Zn-based methanol synthesis catalyst is used as a methanol synthesis catalyst component in a catalyst for producing a liquefied petroleum gas, in general, a catalyst comprising a Y-type zeolite as a zeolite catalyst component exhibits better catalyst performance than a catalyst comprising a β-zeolite. A catalyst for producing a liquefied petroleum gas comprising a Cu—Zn-based methanol synthesis catalyst as a methanol synthesis catalyst component, such as the catalyst in Comparative Example 1, is generally thermally unstable. Therefore, the catalyst cannot be used in a reaction at 375° C. as in Example 1, or, if it can be used, may become ineffective in a short time due to significant deterioration with time.

As seen in Table 1, Example 1 employing the catalyst of this invention consisting of Pd—Ca/$SiO_2$ and the β-zeolite exhibited a higher activity and a higher selectivity for propane and butane, in comparison with Comparative Example 2 employing the catalyst consisting of Pd—Ca/$SiO_2$ and the USY zeolite (Y-type zeolite).

Comparative Example 3 employing the catalyst comprising the USY zeolite with a higher molar ratio of $SiO_2/Al_2O_3$ than Comparative Example 2, as a zeolite catalyst component, exhibited a higher activity and a higher selectivity for propane and butane, in comparison with Comparative Example 2. However, as seen in Table 1, Example 1 employing the catalyst of this invention exhibited a higher selectivity for propane and butane, in comparison with Comparative Example 3.

Example 2

(Preparation of a Catalyst)

A catalyst was prepared in the same way as Example 1, except that CARiACT G3 (trade name), produced by Fuji Silysia Chemical Ltd., was used as a silica, which is a support for a Pd-based methanol synthesis catalyst component, and that the Pd-based methanol synthesis catalyst component and the β-zeolite catalyst component were mixed with Pd—Ca/$SiO_2$:β-zeolite=1:1 (by weight). The silica had a specific surface area of 820 $m^2/g$ and an average pore size of 2.2 nm, respectively, as determined by a BET method with $N_2$ as an adsorption gas, using ASAP2010 (Shimadzu Corporation).

(Production of LPG)

In a tubular reactor with an inner diameter of 6 mm was placed 1 g of the catalyst prepared as above, and the catalyst was reduced under a hydrogen stream at 400° C. for 3 hours before the beginning of the reaction.

After reduction treatment of the catalyst, a starting gas consisting of 66.7 mol % of hydrogen and 33.3 mol % of carbon monoxide ($H_2/CO$=2 (molar ratio)) was passed through the catalyst layer at a reaction temperature of 350° C., a reaction pressure of 2.1 MPa and a gas space velocity of 2000 $hr^{-1}$ (W/F=9.0 g·h/mol) to carry out the LPG production reaction. Gas chromatographic analysis of the product indicated that, after three hours from the beginning of the reaction, a conversion of carbon monoxide was 35.0%, a shift reaction conversion of carbon monoxide to carbon dioxide was 14.5%, and a conversion of carbon monoxide to a hydrocarbon was 20.6%. The produced hydrocarbon gas contained propane and butane in 69.6% on the basis of carbon, which consisted of 49.9% of propane and 50.1% of butane on the basis of carbon.

The results are shown in Table 2.

Example 3

(Preparation of a Catalyst)

A catalyst was prepared in the same way as Example 2, except that CARiACT Q3 (trade name), produced by Fuji Silysia Chemical Ltd., was used as a silica, which is a support for a Pd-based methanol synthesis catalyst component. The silica had a specific surface area of 550 $m^2/g$ and an average pore size of 3.0 nm, respectively, as determined by a BET method with $N_2$ as an adsorption gas, using ASAP2010 (Shimadzu Corporation).

(Production of LPG)

Using the prepared catalyst, the LPG production reaction was carried out in the same way as Example 2. Gas chromatographic analysis of the product indicated that, after three hours from the beginning of the reaction, a conversion of carbon monoxide was 33.5%, a shift reaction conversion of carbon monoxide to carbon dioxide was 14.3%, and a conversion of carbon monoxide to a hydrocarbon was 19.2%. The produced hydrocarbon gas contained propane and butane in 76.3% on the basis of carbon, which consisted of 52.8% of propane and 47.2% of butane on the basis of carbon.

The results are shown in Table 2.

Example 4

(Preparation of a Catalyst)

A catalyst was prepared in the same way as Example 2, except that CARiACT Q6 (trade name), produced by Fuji Silysia Chemical Ltd., was used as a silica, which is a support for a Pd-based methanol synthesis catalyst component. The silica had a specific surface area of 450 $m^2/g$ and an average pore size of 6.0 nm, respectively, as determined by a BET method with $N_2$ as an adsorption gas, using ASAP2010 (Shimadzu Corporation).

(Production of LPG)

Using the prepared catalyst, the LPG production reaction was carried out in the same way as Example 2. Gas chromatographic analysis of the product indicated that, after three hours from the beginning of the reaction, a conversion of carbon monoxide was 15.6%, a shift reaction conversion of carbon monoxide to carbon dioxide was 6.8%, and a conversion of carbon monoxide to a hydrocarbon was 8.8%. The produced hydrocarbon gas contained propane and butane in 74.0% on the basis of carbon, which consisted of 55.7% of propane and 44.3% of butane on the basis of carbon.

The results are shown in Table 2.

Example 5

(Preparation of a Catalyst)

A catalyst was prepared in the same way as Example 2, except that CARiACT Q15 (trade name), produced by Fuji Silysia Chemical Ltd., was used as a silica, which is a support for a Pd-based methanol synthesis catalyst component. The silica had a specific surface area of 200 m$^2$/g and an average pore size of 15.0 nm, respectively, as determined by a BET method with $N_2$ as an adsorption gas, using ASAP2010 (Shimadzu Corporation).

(Production of LPG)

Using the prepared catalyst, the LPG production reaction was carried out in the same way as Example 2. Gas chromatographic analysis of the product indicated that, after three hours from the beginning of the reaction, a conversion of carbon monoxide was 8.2%, a shift reaction conversion of carbon monoxide to carbon dioxide was 3.3%, and a conversion of carbon monoxide to a hydrocarbon was 4.9%. The produced hydrocarbon gas contained propane and butane in 69.5% on the basis of carbon, which consisted of 55.7% of propane and 44.3% of butane on the basis of carbon.

The results are shown in Table 2.

TABLE 2

| | Example 2 | Example 3 | Example 4 | Example 5 |
|---|---|---|---|---|
| Specific surface area of silica (m$^2$/g) | 820 | 550 | 450 | 200 |
| Average pore size of silica (nm) | 2.2 | 3.0 | 6.0 | 15.0 |
| CO conversion (%) | 35.0 | 33.5 | 15.6 | 8.2 |
| CO$_2$ yield (%) | 14.5 | 14.3 | 6.8 | 3.3 |
| Hydrocarbon yield (%) | 20.6 | 19.2 | 8.8 | 4.9 |
| Product composition (%) | | | | |
| C1(methane) | 3.8 | 3.4 | 7.0 | 6.6 |
| C2(ethane) | 12.7 | 7.8 | 6.3 | 9.3 |
| C3(propane) | 34.7 | 40.3 | 41.2 | 38.7 |
| C4(butane) | 34.9 | 36.0 | 32.8 | 30.7 |
| C5(pentane) | 11.4 | 9.8 | 9.6 | 11.7 |
| C6(hexane) | 2.5 | 2.7 | 3.2 | 3.0 |
| C3 + C4 | 69.6 | 76.3 | 74.0 | 69.5 |
| C3/(C3 + C4) | 49.9 | 52.8 | 55.7 | 55.7 |

Figure 3:
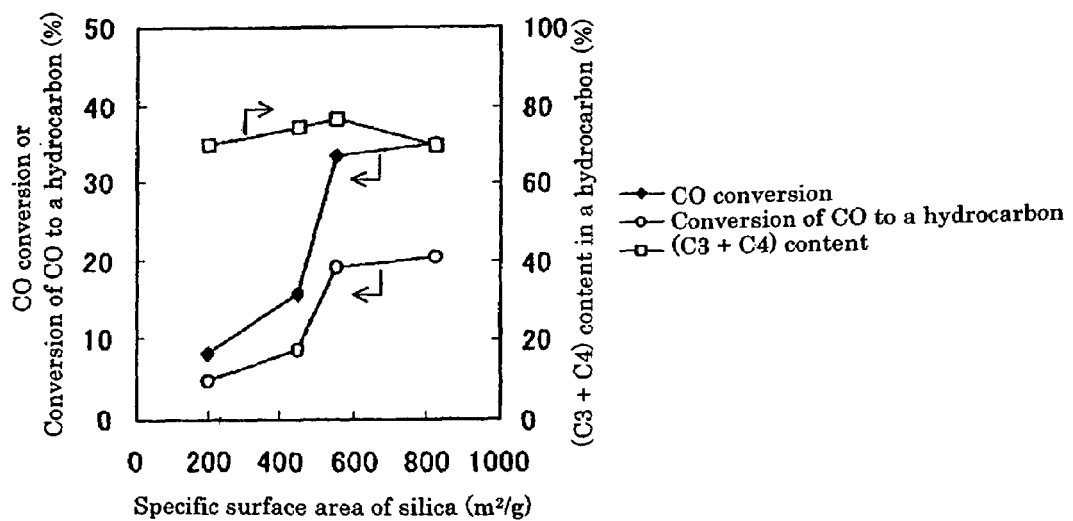
FIG. 3 is a graph showing the dependence of the conversion of carbon monoxide, the conversion into a hydrocarbon and the total content of propane and butane in the produced hydrocarbon gas, on a specific surface area of silica that is the support of a Pd-based methanol synthesis catalyst component.

FIG. 3 shows the dependence of a conversion of carbon monoxide, a conversion into a hydrocarbon and a total content of propane and butane in a produced hydrocarbon gas, on a specific surface area of silica that is a support for a Pd-based methanol synthesis catalyst component.

As seen in Table 2 and FIG. 3, there is a tendency that as a specific surface area of a silica support for a Pd-based methanol synthesis catalyst component increases, a conversion of carbon monoxide and an yield of propane and butane increase, while a selectivity for propane and butane changes little.

Example 6

(Production of LPG)

In a tubular reactor with an inner diameter of 6 mm was placed 1 g of the catalyst prepared in the same way as Example 1, and the catalyst was reduced under a hydrogen stream at 400° C. for 3 hours before the beginning of the reaction.

After reduction treatment of the catalyst, a starting gas consisting of 66.7 mol % of hydrogen and 33.3 mol % of carbon monoxide ($H_2$/CO=2 (molar ratio)) was passed through the catalyst layer at a reaction temperature of 350° C., a reaction pressure of 1.1 MPa and a gas space velocity of 2000 hr$^{-1}$ (W/F=9.0 g·h/mol) to carry out the LPG production reaction. Gas chromatographic analysis of the product indicated that, after three hours from the beginning of the reaction, a conversion of carbon monoxide was 25.8%, a shift reaction conversion of carbon monoxide to carbon dioxide was 11.4%, and a conversion of carbon monoxide to a hydrocarbon was 14.3%. The produced hydrocarbon gas contained propane and butane in 73.0% on the basis of carbon, which consisted of 57.7% of propane and 42.3% of butane on the basis of carbon.

The results are shown in Table 3.

Example 7

(Production of LPG)

The LPG production reaction was carried out in the same way as Example 6, except that a reaction pressure was 2.1 MPa. Gas chromatographic analysis of the product indicated that, after three hours from the beginning of the reaction, a conversion of carbon monoxide was 41.0%, a shift reaction conversion of carbon monoxide to carbon dioxide was 18.2%, and a conversion of carbon monoxide to a hydrocarbon was 22.8%. The produced hydrocarbon gas contained propane and butane in 73.7% on the basis of carbon, which consisted of 50.9% of propane and 49.1% of butane on the basis of carbon.

The results are shown in Table 3.

Example 8

(Production of LPG)

The LPG production reaction was carried out in the same way as Example 6, except that a reaction pressure was 3.1 MPa. Gas chromatographic analysis of the product indicated that, after three hours from the beginning of the reaction, a conversion of carbon monoxide was 62.2%, a shift reaction conversion of carbon monoxide to carbon dioxide was 26.9%, and a conversion of carbon monoxide to a hydrocarbon was 35.3%. The produced hydrocarbon gas contained propane and butane in 73.3% on the basis of carbon, which consisted of 49.0% of propane and 51.0% of butane on the basis of carbon.

The results are shown in Table 3.

Example 9

(Production of LPG)

The LPG production reaction was carried out in the same way as Example 6, except that a reaction pressure was 4.1 MPa. Gas chromatographic analysis of the product indicated that, after three hours from the beginning of the reaction, a conversion of carbon monoxide was 65.5%, a shift reaction conversion of carbon monoxide to carbon dioxide was 27.8%, and a conversion of carbon monoxide to a hydrocarbon was 37.7%. The produced hydrocarbon gas contained propane and butane in 68.7% on the basis of carbon, which consisted of 46.0% of propane and 54.0% of butane on the basis of carbon.

The results are shown in Table 3.

Example 10

(Production of LPG)

The LPG production reaction was carried out in the same way as Example 6, except that a reaction pressure was 5.1 MPa. Gas chromatographic analysis of the product indicated that, after three hours from the beginning of the reaction, a conversion of carbon monoxide was 71.3%, a shift reaction conversion of carbon monoxide to carbon dioxide was 29.0%, and a conversion of carbon monoxide to a hydrocarbon was 42.3%. The produced hydrocarbon gas contained propane and butane in 69.6% on the basis of carbon, which consisted of 46.4% of propane and 53.6% of butane on the basis of carbon.

The results are shown in Table 3.

TABLE 3

|  | Exam. 6 | Exam. 7 | Exam. 8 | Exam. 9 | Exam. 10 |
|---|---|---|---|---|---|
| Reaction pressure (MPa) | 1.1 | 2.1 | 3.1 | 4.1 | 5.1 |
| CO conversion (%) | 25.8 | 41.0 | 62.2 | 65.5 | 71.3 |
| $CO_2$ yield (%) | 11.4 | 18.2 | 26.9 | 27.8 | 29.0 |
| Hydrocarbon yield (%) | 14.3 | 22.8 | 35.3 | 37.7 | 42.3 |
| Product composition (%) |  |  |  |  |  |
| C1(methane) | 11.3 | 4.0 | 2.5 | 2.5 | 1.8 |
| C2(ethane) | 6.7 | 8.5 | 9.6 | 10.6 | 10.3 |
| C3(propane) | 42.1 | 37.5 | 35.9 | 31.6 | 32.3 |
| C4(butane) | 30.8 | 36.3 | 37.4 | 37.1 | 37.3 |
| C5(pentane) | 7.0 | 10.8 | 11.7 | 14.8 | 14.8 |
| C6(hexane) | 2.0 | 2.8 | 2.8 | 3.3 | 3.3 |
| C7(heptane) | 0.0 | 0.1 | 0.1 | 0.2 | 0.2 |
| C3 + C4 | 73.0 | 73.7 | 73.3 | 68.7 | 69.6 |
| C3/(C3 + C4) | 57.7 | 50.9 | 49.0 | 46.0 | 46.4 |

Figure 4:
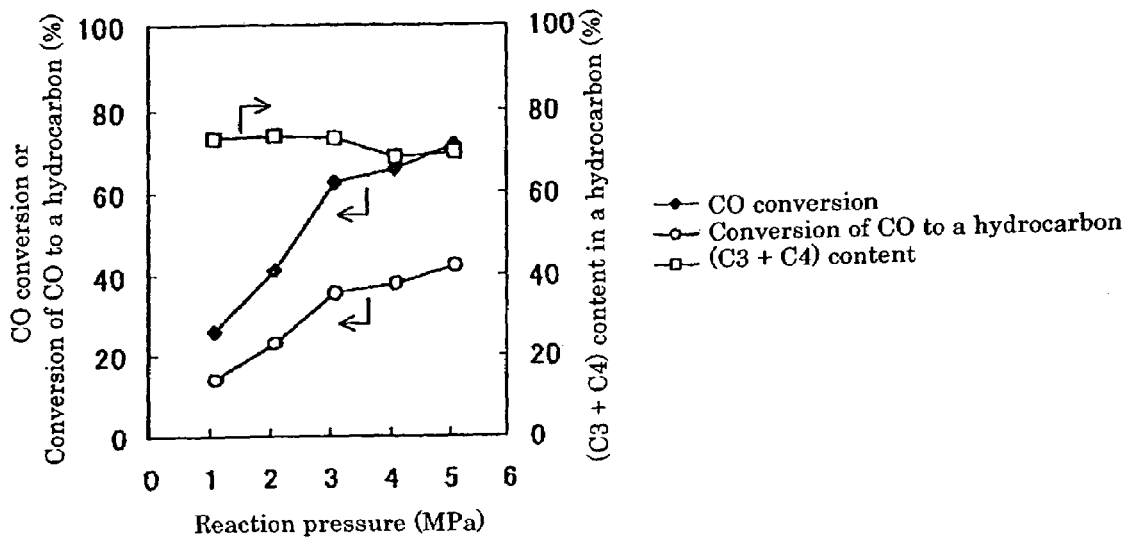
FIG. 4 is a graph showing the dependence of the conversion of carbon monoxide, the conversion into a hydrocarbon and the total content of propane and butane in the produced hydrocarbon gas, on a reaction pressure.

FIG. 4 shows the dependence of a conversion of carbon monoxide, a conversion into a hydrocarbon and a total content of propane and butane in a produced hydrocarbon gas, on a reaction pressure.

As seen in Table 3 and FIG. 4, there is a tendency that as a reaction pressure increases, a conversion of carbon monoxide and an yield of propane and butane increase, while a selectivity for propane and butane changes little.

Example 11

(Preparation of a Catalyst)

A catalyst was prepared in the same way as Example 1, except that a Pd-based methanol synthesis catalyst component and a β-zeolite catalyst component were separately molded by a tablet-compression to be a granule having an average particle size of 1 mm, without mechanically powdering, and then these were mixed.

(Production of LPG)

Using the prepared catalyst, the LPG production reaction was carried out in the same way as Example 1, except that a reaction pressure was 5.1 MPa. Gas chromatographic analysis of the product indicated that, after three hours from the beginning of the reaction, a conversion of carbon monoxide was 87.4%, a shift reaction conversion of carbon monoxide to carbon dioxide was 32.7%, a conversion of carbon monoxide to a hydrocarbon was 54.2%, and a conversion of carbon monoxide to dimethyl ether was 0.6%. The produced hydrocarbon gas contained propane and butane in 76.4% on the basis of carbon, which consisted of 65.3% of propane and 34.7% of butane on the basis of carbon. And, after fifty hours from the beginning of the reaction, a conversion of carbon monoxide was 82.8%, a shift reaction conversion of carbon monoxide to carbon dioxide was 35.2%, and a conversion of carbon monoxide to a hydrocarbon was 47.5%. The produced hydrocarbon gas contained propane and butane in 74.9% on the basis of carbon, which consisted of 48.5% of propane and 51.5% of butane on the basis of carbon.

Figure 5:
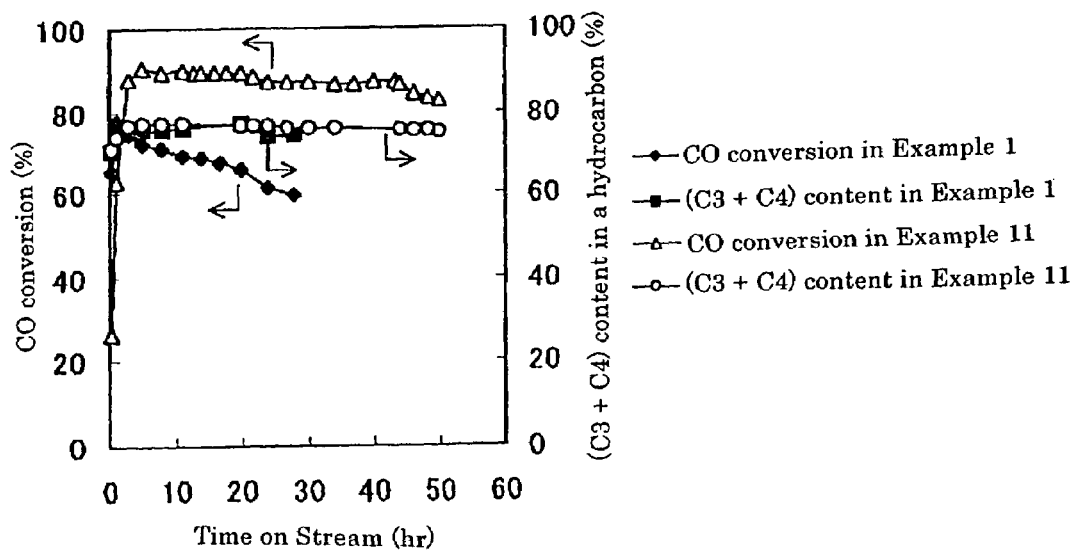
FIG. 5 is a graph showing the change in the conversion of carbon monoxide and the total content of propane and butane in the produced hydrocarbon gas with time in Examples 1 and 11.

The results are shown in Table 4. FIG. 5 shows the change in a conversion of carbon monoxide and a total content of propane and butane in a produced hydrocarbon gas with time. For comparison, the results of Example 1 are also shown in Table 4 and FIG. 5.

TABLE 4

|  | Example 1 |  | Example 11 |  |
|---|---|---|---|---|
| Average particle size of a catalyst component | 0.7 μm |  | 1 mm |  |
| Reaction pressure (MPa) | 4.1 |  | 5.1 |  |
| Time on Stream (hr) | 3 | 28 | 3 | 50 |
| CO conversion (%) | 74.1 | 59.4 | 87.4 | 82.8 |
| $CO_2$ yield (%) | 33.3 | 28.2 | 32.7 | 35.2 |
| Hydrocarbon yield (%) | 40.7 | 31.2 | 54.2 | 47.5 |
| Product composition (%) |  |  |  |  |
| C1(methane) | 7.2 | 4.5 | 7.8 | 5.3 |
| C2(ethane) | 8.5 | 8.6 | 10.4 | 8.8 |
| C3(propane) | 42.6 | 38.2 | 49.9 | 36.3 |
| C4(butane) | 32.6 | 35.8 | 26.5 | 38.5 |
| C5(pentane) | 7.1 | 10.1 | 4.1 | 8.2 |
| C6(hexane) | 1.9 | 2.7 | 1.2 | 2.6 |
| C7(heptane) | 0.1 | 0.2 | 0.0 | 0.3 |
| C3 + C4 | 75.2 | 74.0 | 76.4 | 74.9 |
| C3/(C3 + C4) | 56.6 | 51.6 | 65.3 | 48.5 |

As seen in Table 4 and FIG. 5, Example 11 employing the catalyst obtained by mixing the granular Pd—Ca/$SiO_2$ and the granular β-zeolite exhibited significantly less decrease in activity, i.e., significantly less deterioration of the catalyst, in comparison with Example 1 employing the catalyst obtained by mixing the powdery Pd—Ca/$SiO_2$ and the powdery β-zeolite.

INDUSTRIAL APPLICABILITY

As described above, a catalyst for producing a liquefied petroleum gas according to the present invention is a less deteriorative catalyst with a longer catalyst life, which can produce a hydrocarbon containing propane or butane as a main component, i.e., a liquefied petroleum gas (LPG), by reacting carbon monoxide and hydrogen, with high activity, high selectivity and high yield. Therefore, by using the catalyst of this invention, propane and/or butane can be stably produced for a long period with high activity, high selectivity and high yield, from a carbon-containing starting material such as a natural gas or a synthesis gas. In other words, by using the catalyst of this invention, a liquefied petroleum gas with a high concentration of propane and/or butane can be stably produced for a long period with high yield, from a carbon-containing starting material such as a natural gas or a synthesis gas.

What is claimed is:

1. A process for producing a liquefied petroleum gas, comprising:

reacting carbon monoxide and hydrogen in the presence of a catalyst to produce a liquefied petroleum gas containing propane or butane as a main component, wherein the catalyst comprises a Pd-based methanol synthesis catalyst component and a β-zeolite catalyst component.

2. The process for producing a liquefied petroleum gas according to claim 1, wherein a reaction temperature in the reaction of carbon monoxide and hydrogen is 300° C. to 420° C.

3. The process for producing a liquefied petroleum gas according to claim 1, wherein a reaction pressure in the reaction of carbon monoxide and hydrogen is 2.2 MPa to 10 MPa.

4. A process for producing a liquefied petroleum gas, comprising:
   feeding a synthesis gas to a catalyst layer comprising a catalyst to produce a liquefied petroleum gas containing propane or butane as a main component, wherein the catalyst comprises a Pd-based methanol synthesis catalyst component and a β-zeolite catalyst component.

5. A process for producing a liquefied petroleum gas, comprising:
   (1) producing a synthesis gas from a carbon-containing starting material and at least one selected from the group consisting of $H_2O$, $O_2$ and $CO_2$; and
   (2) feeding the synthesis gas to a catalyst layer comprising a catalyst to produce a liquefied petroleum gas containing propane or butane as a main component, wherein the catalyst comprises a Pd-based methanol synthesis catalyst component and a β-zeolite catalyst component.

6. The process for producing a liquefied petroleum gas according to claim 1, wherein the catalyst has a ratio (by weight) of the Pd-based methanol synthesis catalyst component to the β-zeolite catalyst component expressed by the equation:

$$(\text{methanol synthesis catalyst component})/(\text{zeolite catalyst component}) \text{ of } 0.1 \text{ to } 3.$$

7. The process for producing a liquefied petroleum gas according to claim 1, wherein Pd, in the Pd-based methanol synthesis catalyst, is supported on a support.

8. The process for producing a liquefied petroleum gas according to claim 7, wherein the amount of supported Pd in the Pd-based methanol synthesis catalyst component is 0.1 to 10% by weight.

9. The process for producing a liquefied petroleum gas according to claim 7, wherein the support for the Pd-based methanol synthesis catalyst component is silica.

10. The process for producing a liquefied petroleum gas according to claim 9, wherein a specific surface area of the silica support for the Pd-based methanol synthesis catalyst component is 420 $m^2/g$ or more.

11. The process for producing a liquefied petroleum gas according to claim 9, wherein one or more types of basic metals, in addition to Pd, is supported on the silica.

12. The process for producing a liquefied petroleum gas according to claim 11, wherein the total amount of the basic metals supported in the Pd-based methanol synthesis catalyst component is 0 to 5% by weight.

13. The process for producing a liquefied petroleum gas according to claim 1, wherein the β-zeolite catalyst component is a proton-type β-zeolite with a $SiO_2/Al_2O_3$ molar ratio of 10 to 150.

* * * * *